(12) United States Patent
Liu

(10) Patent No.: US 12,536,314 B2
(45) Date of Patent: Jan. 27, 2026

(54) TRANSACTION DATA PROCESSING METHOD AND APPARATUS, COMPUTER DEVICE AND STORAGE MEDIUM

(71) Applicant: TENCENT TECHNOLOGY (SHENZHEN) COMPANY LIMITED, Guangdong (CN)

(72) Inventor: Pan Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 330 days.

(21) Appl. No.: 18/314,471

(22) Filed: May 9, 2023

(65) Prior Publication Data
US 2023/0315891 A1    Oct. 5, 2023

Related U.S. Application Data

(63) Continuation of application No. PCT/CN2022/112467, filed on Aug. 15, 2022.

(30) Foreign Application Priority Data

Sep. 24, 2021 (CN) .......................... 202111125184.0

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC .... G06F 21/6218; G06F 21/602; G06F 21/64; G06Q 40/04
See application file for complete search history.

(56) References Cited

U.S. PATENT DOCUMENTS

| 10,719,816 B1* | 7/2020 | Kurani | .................. H04W 48/12 |
| 11,120,513 B2* | 9/2021 | Yang | ...................... G06Q 40/02 |

(Continued)

FOREIGN PATENT DOCUMENTS

| CN | 112396423 A | 2/2021 |
| CN | 112685796 A | 4/2021 |
| CN | 113570466 A | 10/2021 |

OTHER PUBLICATIONS

International Search Report for PCT/CN2022/112467 dated Oct. 26, 2022.

(Continued)

*Primary Examiner* — Meng Li
(74) *Attorney, Agent, or Firm* — Sughrue Mion, PLLC

(57) ABSTRACT

The present disclosures relates to methods and apparatus for managing a blockchain. The method includes executing an initial transaction to obtain an initial transaction execution record; adding the initial transaction execution record to a first transaction execution data set; adding the initial transaction to a first transaction pool; acquiring transaction data from the first transaction pool that contains the initial transaction, the transaction data comprising respective initial transaction execution record corresponding to each transaction in a transaction list containing the initial transaction from the first transaction pool; generating a proposal block based on the transaction list and the transaction data, the proposal block being subject to block consensus with a second consensus node in the blockchain network; and performing block consensus on the proposal block to obtain a block consensus result of the proposal block.

19 Claims, 10 Drawing Sheets

(56) References Cited

U.S. PATENT DOCUMENTS

| | | | |
|---|---|---|---|
| 11,263,623 B1* | 3/2022 | Liu | G06F 16/901 |
| 11,605,076 B2* | 3/2023 | Dunjic | G06Q 20/389 |
| 12,099,997 B1* | 9/2024 | Hoffberg | G06Q 20/065 |
| 2019/0342078 A1* | 11/2019 | Li | H04L 67/1095 |
| 2020/0076571 A1 | 3/2020 | Natarajan et al. | |
| 2020/0120157 A1* | 4/2020 | Xie | H04L 9/0643 |
| 2020/0186355 A1* | 6/2020 | Davies | H04L 63/029 |
| 2020/0195441 A1 | 6/2020 | Suen et al. | |
| 2020/0242215 A1* | 7/2020 | Zou | G06Q 20/405 |
| 2021/0026740 A1* | 1/2021 | Guo | G06Q 20/389 |
| 2021/0027289 A1* | 1/2021 | Guo | H04L 9/3247 |
| 2021/0073913 A1* | 3/2021 | Ingargiola | H04L 63/12 |
| 2022/0100733 A1* | 3/2022 | Tock | H04L 9/3239 |
| 2022/0156776 A1* | 5/2022 | Long | G06Q 30/0215 |
| 2023/0259526 A1* | 8/2023 | Liu | H04L 9/50 |
| | | | 707/700 |
| 2023/0308864 A1* | 9/2023 | Qiao | H04W 4/24 |
| 2023/0315891 A1* | 10/2023 | Liu | G06F 21/602 |
| | | | 726/26 |
| 2024/0106670 A1* | 3/2024 | Mee | H04L 9/50 |
| 2024/0205032 A1* | 6/2024 | Wang | H04L 9/32 |

OTHER PUBLICATIONS

Written Opinion for PCT/CN2022/112467 dated Oct. 26, 2022.
Extended European Search Report issued Feb. 21, 2024 in Application No. 22871678.3.

* cited by examiner

TRANSACTION DATA PROCESSING METHOD AND APPARATUS, COMPUTER DEVICE AND STORAGE MEDIUM

CROSS-REFERENCE TO RELATED APPLICATIONS

This application claims priority to International Application No.: PCT/CN2022/112467, filed with the China National Intellectual Property Administration on Aug. 15, 2022, which claims priority to Chinese Patent Application No. 202111125184.0 filed with the China National Intellectual Property Administration on Sep. 24, 2021, the disclosures of which are incorporated herein in their entireties.

FIELD

This disclosure relates to the field of blockchain technologies, and in particular, to a transaction data processing method and apparatus, a computer device, and a storage medium.

BACKGROUND

With the rapid development of network technology and the emphasis of government and enterprises on data security, blockchains have been widely used. A blockchain is a decentralized database. Each node in the database may store an identical blockchain. A blockchain network may include a consensus node. The consensus node may be responsible for the consensus of the whole network of the blockchain. A block may be a data packet carrying transaction data on the blockchain network. The block may be verified by a consensus mechanism of a network and determines transactions in the block.

In related art, the whole consensus stage must to use serial logic, which means that each round of consensus needs to pass through three stages, that is, proposal, pre-voting, and pre-submission, and a consensus process involves the sequential execution of transactions, which results in that the whole consensus stage needs to consume a long consensus duration, and further results in that system resources occupied in the consensus stage cannot be released within the long consensus duration, so that the throughput of the whole blockchain will be reduced.

SUMMARY

According to various embodiments provided in this application, a transaction data processing and blockchain maintaining method and apparatus, and a readable storage medium are provided.

An aspect of the present disclosure relates to a method for managing a blockchain, the method being performed by a first consensus node in a blockchain network, and the method includes executing, in response to receiving an initial transaction, the initial transaction to obtain an initial transaction execution record corresponding to the initial transaction; adding the initial transaction execution record to a first transaction execution data set, the first transaction execution data set being used for recording the initial transaction execution record corresponding to each transaction received by the first consensus node; adding the initial transaction to a first transaction pool; acquiring transaction data from the first transaction pool that contains the initial transaction, the transaction data comprising respective initial transaction execution record corresponding to each transaction in a transaction list containing the initial transaction from the first transaction pool, the respective initial transaction corresponding to each transaction in the transaction list being acquired from the first transaction execution data set; generating a proposal block based on the transaction list and the transaction data, the proposal block being subject to block consensus with a second consensus node in the blockchain network; and performing block consensus on the proposal block to obtain a block consensus result of the proposal block.

An aspect of the present disclosure relates to a method for managing a blockchain, the method performed by a second consensus node in a blockchain network, and the method includes receiving a proposal block broadcast by a first consensus node in the blockchain network, the proposal block being based on a transaction list and transaction data associated with the transaction list, wherein the transaction list is acquired by the first consensus node from a first transaction pool of the first consensus node, and the transaction list contains an initial transaction, and wherein the transaction data comprises an initial transaction execution record corresponding to each transaction in the transaction list in a first transaction execution data set; obtaining a second consensus result of the proposal block by performing conflict detection on the proposal block based on a conflict detection policy; and transmitting the second consensus result of the proposal block to the first consensus node.

An aspect of the present disclose relates to a blockchain management system, the system comprising a first consensus node in a blockchain network, the first consensus node including at least one first memory configured to store a first program code; and at least one first processor configured to read the first program code and operate as instructed by the first program code, the first program code including first executing code configured to cause the at least one first processor to execute, in response to receiving an initial transaction, the initial transaction to obtain an initial transaction execution record corresponding to the initial transaction; first adding code configured to cause the at least one first processor to add the initial transaction execution record to a first transaction execution data set, the first transaction execution data set being used for recording the initial transaction execution record corresponding to each transaction received by the first consensus node; second adding code configured to cause the at least one first processor to add the initial transaction to a first transaction pool; first acquiring code configured to cause the at least one first processor to acquire transaction data from the first transaction pool that contains the initial transaction, the transaction data comprising respective initial transaction execution record corresponding to each transaction in a transaction list containing the initial transaction from the first transaction pool, the respective initial transaction corresponding to each transaction in the transaction list being acquired from the first transaction execution data set; first generating code configured to cause the at least one first processor to generate a proposal block based on the transaction list and the transaction data, the proposal block being subject to block consensus with a second consensus node in the blockchain network; and first performing code configured to cause the at least one first processor to perform block consensus on the proposal block to obtain a block consensus result of the proposal block.

An aspect of the present disclosure relates to a blockchain management system, the system comprising a second consensus node, the second consensus node including at least one second memory configured to store a second program code; and at least one second processor configured to read the second program code and operate as instructed by the second program code, the second program code including second receiving code configured to cause the at least one second processor to receive a proposal block broadcast by the first consensus node in the blockchain network, the proposal block being based on the transaction list and transaction data associated with the transaction list, wherein the transaction list is acquired by the first consensus node from the first transaction pool of the first consensus node, and the transaction list contains an initial transaction, and wherein the transaction data comprises an initial transaction execution record corresponding to each transaction in the transaction list in the first transaction execution data set; second obtaining code configured to cause the at least one second processor to obtain a second consensus result of the proposal block by performing conflict detection on the proposal block based on a conflict detection policy; and first transmitting code configured to cause the at least one second processor to transmit the second consensus result of the proposal block to the first consensus node.

A computer device includes a non-transitory memory and one or more processors. The non-transitory memory stores non-transitory computer-readable instructions. The non-transitory computer-readable instructions, when executed by the one or more processors, enable the one or more processors to perform steps of the above transaction data processing method.

A computer device includes a memory and one or more processors. The memory stores non-transitory computer-readable instructions. The non-transitory computer-readable instructions, when executed by the one or more processors, enable the one or more processors to implement steps of the above transaction data processing method.

A computer program product includes non-transitory computer-readable instructions. The non-transitory computer-readable instructions, when executed by a processor, implement steps in the above transaction data processing method.

Details of one or more embodiments of the disclosure are set forth in the following drawings and description. Other features, objects, and advantages of the disclosure will be apparent from the specification, drawings, and claims.

BRIEF DESCRIPTION OF THE DRAWINGS

In order to illustrate the embodiments of the disclosure or the technical solutions in the conventional art more clearly, the drawings used in the description of the embodiments or the conventional art will be briefly described below. It is apparent that the drawings in the following description are only some embodiments of the disclosure, and other drawings may be obtained from those skilled in the art according to these drawings without any creative work.

DETAILED DESCRIPTION

The following clearly and completely describes the technical solutions in the embodiments of the disclosure with reference to the accompanying drawings in the embodiments of the disclosure. Apparently, the described embodiments are merely some but not all of the embodiments of the disclosure. All other embodiments obtained by those of ordinary skill in the art based on the embodiments of the disclosure without creative efforts fall within the scope of protection of the disclosure.

Figure 1:
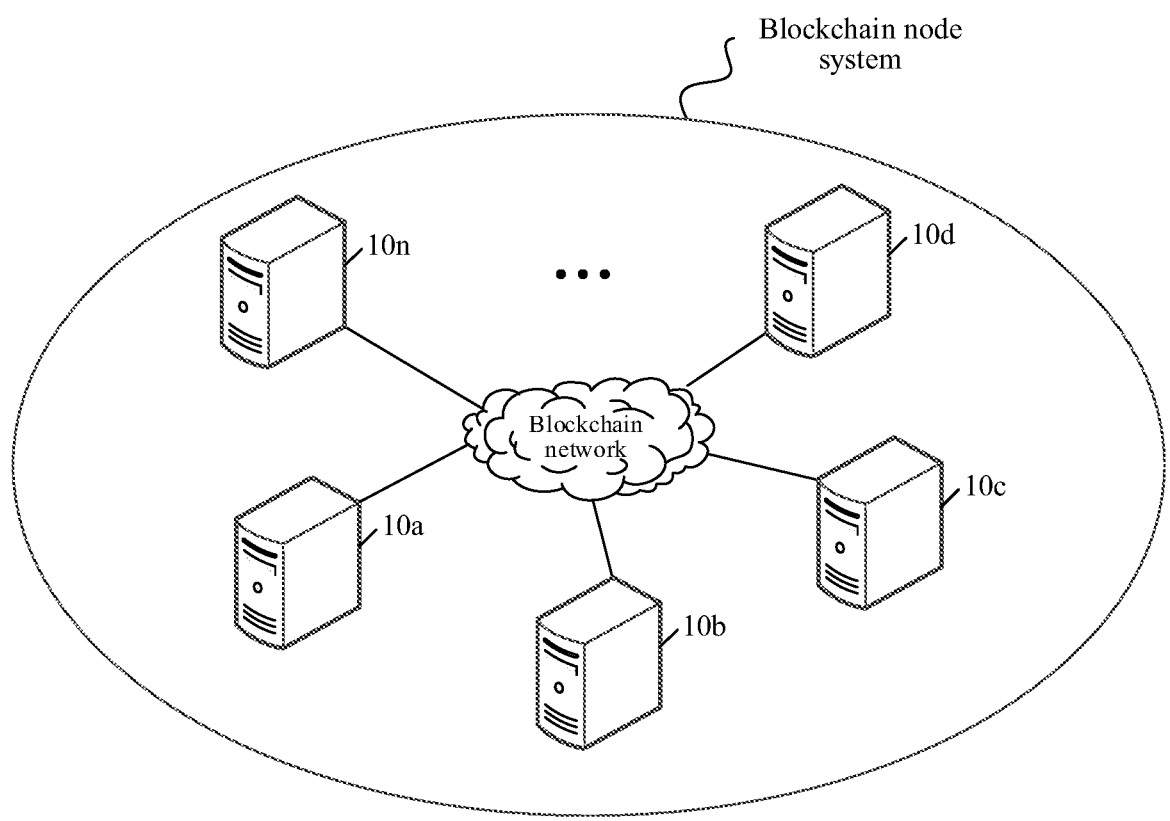
FIG. 1 is a schematic structural diagram of a blockchain node system provided by the embodiments of the disclosure.

FIG. 1 is a schematic structural diagram of a blockchain node system provided by the embodiments of the disclosure. A blockchain is a new application mode of computer technologies such as distributed data storage, peer to peer transmission, a consensus mechanism, and an encryption algorithm, which is mainly used for sorting data according to a time sequence and encrypt the data into an account book, so that the data cannot be tampered and forged, and meanwhile, the data may be verified, stored, and updated. A blockchain is essentially a decentralized database. Each node in the database stores an identical blockchain. A blockchain network includes a consensus node. The consensus node is responsible for the consensus of the whole network of the blockchain. A block is a data packet carrying transaction data (that is, a transaction service) on the blockchain network, and is a data structure marked with a timestamp and a hash value of a previous block. The block is verified by a consensus mechanism of a network and determines transactions in the block.

A blockchain system may include a smart contract. The smart contract may refer to code that may be understood and executed by each node (including a consensus node) of the blockchain, and may execute any logic and obtain a result. The blockchain may include one or more smart contracts. These smart contracts may be distinguished by an identity document (ID) or a name, while a transaction service request may carry the ID or the name of the smart contract, so as to specify a smart contract that needs to be run by the blockchain.

The blockchain node system as shown in FIG. 1 may correspond to the blockchain network. The blockchain network may include, but is not limited to, a blockchain network corresponding to a consortium blockchain. The blockchain node system refers to a system for sharing data between blockchain nodes. The blockchain node system may include a plurality of nodes. The plurality of nodes may specifically include a node 10a, a node 10b, a node 10c, a node 10d, . . . , and a node 10n. The node 10a, the node 10b, the node 10c, the node 10d, . . . , and the node 10n may be collectively referred to as blockchain nodes. A blockchain node may be a server that accesses a blockchain network, or a terminal device that accesses the blockchain network.

Each node may receive data transmitted from the outside during normal operation, perform block upload processing based on the received data, and may also transmit data to the outside. To ensure data interworking between the various nodes, there may be data connection between every two nodes. For example, there is data connection between the node 10a and the node 10b, a data connection between the node 10a and the node 10c, and a data connection between the node 10b and the node 10c. The above data connection may be directly or indirectly connected in a wired communication mode, or may be directly or indirectly connected in a wireless communication mode.

Data or block transmission between nodes may be performed through the above data connection. The blockchain network may realize the data connection between the nodes based on node identifiers. Each node in the blockchain network has a node identifier corresponding thereto, and each of the above nodes may store node identifiers of other nodes having a connection relationship with itself, so as to subsequently broadcast the acquired data or the generated block to the other nodes according to the node identifiers of the other nodes. For example, a node identifier list as shown in Table 1 may be maintained in the node 10a. The node identifier list stores node names and node identifiers of the other nodes:

TABLE 1

| Node name | Node identifier |
| --- | --- |
| Node 10a | 117.114.151.174 |
| Node 10b | 117.116.189.145 |
| Node 10c | 117.114.151.183 |
| Node 10d | 117.117.125.169 |
| ... | ... |
| Node 10n | 117.116.189.125 |

The node identifier may be an Internet protocol (IP, an interconnected protocol between networks) address and any other information which may be used for identifying a node in the blockchain network. Table 1 is described by only taking the IP address as an example. For example, the node 10a may transmit information (for example, a block) to the node 10b through a node identifier 117.116.189.145, and the node 10b may determine, through the node identifier 117.114.151.174, that the information is transmitted by the node 10a. The blockchain network in an embodiment of the disclosure may be a hierarchical structure or a single-layer structure.

For a blockchain network having a hierarchical structure, the blockchain node system shown in FIG. 1 may include a first blockchain system, a second blockchain system, and a proxy node (which may also be referred to as a routing node). Each of the first blockchain system and the second blockchain system may include one or more nodes, and the number of nodes will not be limited herein. For example, the first blockchain system may include the node 10a and the node 10b. The second blockchain system may include the 10c and the 10d. The proxy node may be the node 10n. A blockchain network corresponding to the first blockchain system may be referred to as a service network (that is, a witness network). A node in the service network may be referred to as a service node. The service node is mainly configured to execute a transaction service to obtain transaction data associated with the transaction service. The service node here does not need to participate in an account keeping consensus, but may obtain block header data and the partially authorized visible block data from a core consensus network in an identity authentication mode. The blockchain network corresponding to the second blockchain system may be referred to as the core consensus network. A node in the core consensus network may be referred to as a consensus node (that is, an account keeping node). This consensus node may run a blockchain consensus protocol. The proxy node may be configured to perform network isolation on the above service network and the core consensus network. The proxy node may perform network layering on a peer to peer (P2P) network to form a layered structure such as a "service network-core consensus network", which improves the confidentiality and security of data on a blockchain.

For a blockchain network having a single-layer structure, the blockchain node system shown in FIG. 1 may include a consensus node and a non-consensus node. The consensus node participates in a consensus, but the non-consensus node does not participate in the consensus, but may help to propagate a block and vote on a message, mutually synchronize states, and the like. For example, the node 10a, the node 10b, the node 10c, and the node 10d in FIG. 1 may be taken as consensus nodes, and the remaining nodes are taken as non-consensus nodes.

The transaction data processing method provided by the embodiments of the disclosure may be performed by a computer device. The computer device includes, but is not limited to, the above consensus node (which may be a terminal device or a server). The above server may be an independent physical server, or may be a server cluster or a distributed system composed of a plurality of physical servers, or may be a cloud server providing basic cloud computing services such as a cloud service, a cloud database, cloud computing, a cloud function, cloud storage, a network service, cloud communication, a middleware service, a domain name service, a security service, a CDN, big data, and an artificial intelligence platform. The above terminal device may be a smart phone, a tablet computer, a notebook computer, a palmtop computer, a smart speaker, a mobile Internet device (MID), a point of sales (POS) machine, a wearable device (such as smart watch and a smart band), and the like.

In a blockchain, before a block (which may be referred to as a proposal block, a proposed block, or a block to be uploaded) is uploaded, the block has to be subjected to a consensus by a consensus node in a blockchain network, and the block may only be added to the blockchain after the consensus. When the blockchain is used in some scenes in a government or business institutions, not all participating nodes (that is, the blockchain nodes in the above blockchain node system) in the blockchain have sufficient resources and necessity to become consensus nodes of the blockchain. For example, in the blockchain node system shown in FIG. 1, the node 10a, the node 10b, the node 10c, and the node 10d may be taken as the consensus nodes in the blockchain node system. The consensus nodes in the blockchain node system participate in the consensus, that is, the consensus is performed on a block (including a batch of transactions), including generating a proposal block and voting on the proposal block. Non-consensus nodes do not participate in the consensus, but help to propagate a block and vote on a message, mutually synchronize states, and the like.

In the blockchain node system shown in FIG. 1, the embodiments of the disclosure may take a consensus node for packing and generating a proposal block as a first consensus node (which may also be referred to as a packing node and a proposed node), the first consensus node may broadcast the proposal block to other consensus nodes in the blockchain network, and the embodiments of the disclosure may take other consensus nodes for performing block consensus on the proposal block as second consensus nodes. The proposed node also belongs to a consensus node, and block consensus also needs to be performed on the proposal block. For example, the first consensus node may be the node 10a in the blockchain node system shown in FIG. 1, and the second consensus node may be the node 10b, the node 10c, and the node 10d in the blockchain node system shown in FIG. 1. In addition, both the first consensus node and the second consensus node may execute a received transaction, and each consensus node has its own transaction pool for adding a transaction to be packed. Each transaction pool is also associated with a transaction execution data set. The transaction execution data set may be used for recording a transaction execution record corresponding to each transaction received by the corresponding consensus node. The transaction execution data set and the transaction pool may be located in separate storage areas or in the same storage area. For example, the transaction execution data set may be located in the transaction pool associated therewith. In an embodiment of the disclosure, the transaction pool of the first consensus node may be referred to as a first transaction pool, the transaction execution data set associated with the first transaction pool may be referred to as a first transaction execution data set, the transaction pool of the second consensus node may be referred to as a second transaction pool, and the transaction execution data set associated with the second transaction pool may be referred to as a second transaction execution data set.

In an embodiment of the disclosure, the first consensus node, in response to receiving an initial transaction, may execute the initial transaction first to obtain an initial transaction execution record corresponding to the initial transaction, then add the initial transaction execution record corresponding to the initial transaction to a first transaction execution data set associated with a first transaction pool of the first consensus node, meanwhile, add the initial transaction to the first transaction pool, then the first consensus node may acquire a transaction list containing the initial transaction from the first transaction pool, and may acquire the initial transaction execution record corresponding to each transaction in the transaction list from the first transaction execution data set, that is, acquire to-be-processed transaction data associated with the transaction list, then the transaction list and the to-be-processed transaction data may be packed to obtain a proposal block, and then the proposal block may be broadcast to the second consensus node, so that the second consensus node and the first consensus node respectively perform block consensus on the proposal block, and finally a block consensus result of the proposal block is obtained. It may be seen therefrom that, in an embodiment of the disclosure, a transaction execution process and a consensus process are decoupled by advancing the transaction execution process before adding a transaction into the transaction pool, which may reduce the consensus duration consumed by the consensus process, so as not to occupy system resources in a consensus stage for a long time. Meanwhile, the utilization rate of the system resources may be improved by using the characteristics of concurrently receiving and concurrently executing transactions of the consensus node, and the block production efficiency may be improved, thereby improving the throughput of the blockchain.

Figure 2:
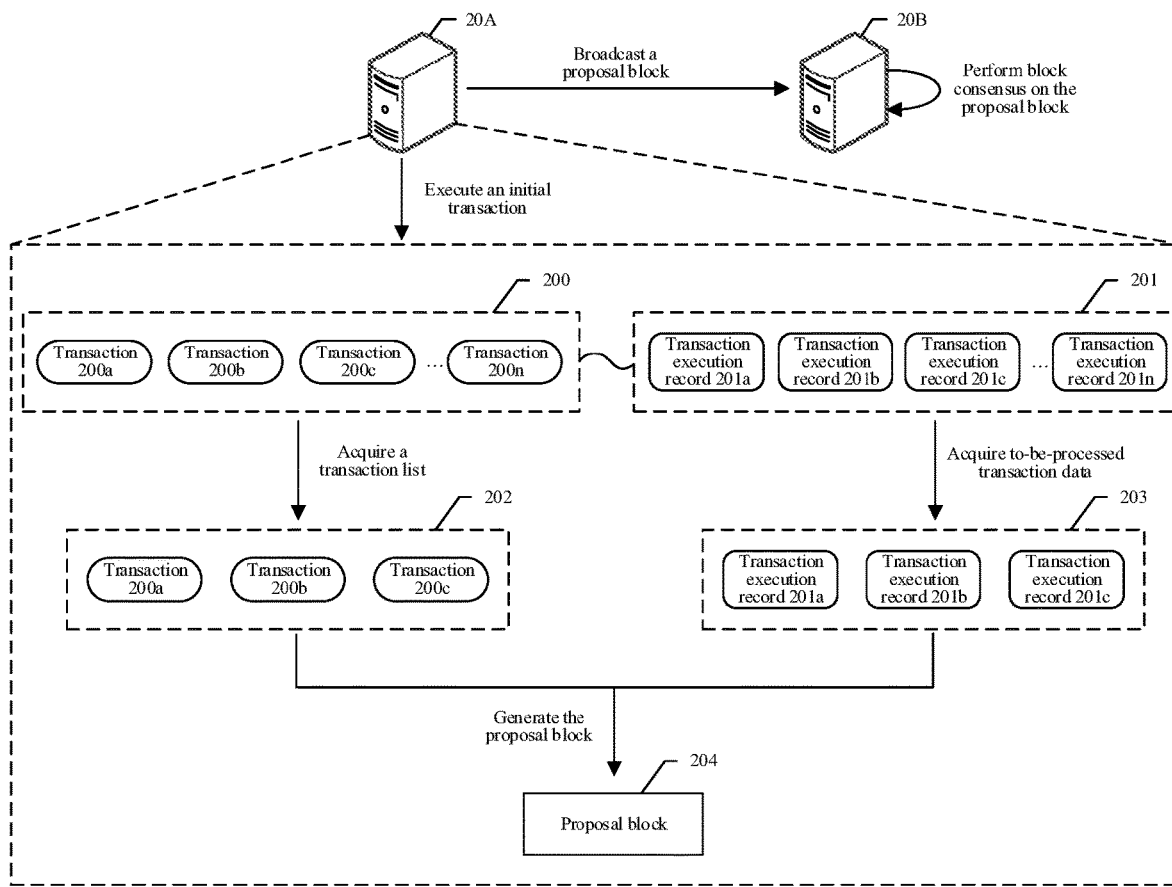
FIG. 2 is a schematic diagram of a scene of a transaction data processing method provided by the embodiments of the disclosure.

FIG. 2 is a schematic diagram of a transaction data processing scene provided by the embodiments of the disclosure. A consensus node 20A in FIG. 2 may be a consensus node for packing a transaction list and to-be-processed transaction data in a blockchain network, that is, a first consensus node. The consensus node 20A may be any consensus node in FIG. 1, for example, the node 10a. A consensus node 20B in FIG. 2 may be a consensus node that is to be subjected to block consensus with the first consensus node in the blockchain network, that is, a second consensus node. For example, the consensus node 20B may be the node 10b in FIG. 1.

In an embodiment of the disclosure, before adding a received transaction to a transaction pool, the consensus node in the blockchain network may execute the transaction first and save a transaction execution record corresponding to the transaction, and subsequently may pack the transaction and the transaction execution record corresponding to the transaction into a proposal block for consensus. The transaction, which may also be referred to as at least one of a transaction request or a user request, may be initiated by an application client on a terminal device for indicating a transaction service that a user expects to perform, for example, the transaction service here may be an asset transfer service. The asset transfer service may be used to transfer at least one of virtual assets such as game coins, game diamonds, or electronic tickets.

In an embodiment of the disclosure, any transaction received by the first consensus node may be taken as an initial transaction, for example, the last transaction received within one packing period may be taken as the initial transaction, and the first consensus node may start packing relevant data immediately after executing the initial transaction. The packing period refers to the duration between two adjacent packing processes, for example, the packing period may be set as 10 seconds, and then the first consensus node will perform the packing process once every 10 seconds.

Taking the first consensus node being the consensus node 20A in FIG. 2, the second consensus node being the consensus node 20B in FIG. 2, the first transaction pool being a transaction pool 200 in FIG. 2, and the first transaction execution data set being a transaction execution data set 201 in FIG. 2 as an example, the consensus node 20A may continuously and concurrently receive a transaction transmitted by the application client. After the transaction is received successfully, the consensus node 20A may execute these transactions in advance to obtain initial transaction execution records respectively corresponding to these transactions. Taking the initial transaction being a transaction 200a as an example, after receiving the transaction 200a, the consensus node 20A may perform validity verification on the transaction 200a to obtain a validity verification result. The consensus node 20A may broadcast the transaction 200a to the consensus node 20B in a case that the validity verification result indicates that the transaction is valid, that is, transaction 200a passes the validity verification, so that the consensus node 20B executes the transaction 200a. Meanwhile, the consensus node 20A may invoke a virtual machine to execute the transaction 200a according to a current account book state, so as to obtain a transaction execution record 201a corresponding to the transaction 200a, that is, the initial transaction execution record corresponding to the initial transaction, and then the transaction 200a may be added to the transaction pool 200 of the consensus node 20A, and the transaction execution record 201a may be added to the transaction execution data set 201 associated with the transaction pool 200. The first transaction execution data set may be used for recording the initial transaction execution record corresponding to each transaction received by the first consensus node. The current account book state is, for example, the remaining asset amount, that is, the account balance. The initial transaction execution record corresponding to each transaction may include a transaction execution result corresponding to the transaction, a transaction read-write set, and a latest block height of an account book in response to executing the transaction. The latest block height of the account book during the execution of the transaction refers to a block height corresponding to a block that is on blockchain corresponding to the blockchain network where the first consensus node is located and that has a maximum generation timestamp.

Similarly, for other transactions received by the consensus node 20A, for example, a transaction 200b, a transaction 200c, . . . , and a transaction 200n. The processing processes for the transactions are consistent with that for the transaction 200a, and finally, the consensus node 20A may generate and save the initial transaction execution record corresponding to each transaction. The consensus node 20B may also execute all received transactions in advance, and the processing processes of the transactions are similar to the processing process of the transaction 200a by the consensus node 20A. In an embodiment of the disclosure, each consensus node may concurrently receive a plurality of transactions or concurrently execute the plurality of transactions, so that the utilization rate of central processing unit (CPU) computing resources and input/output (I/O) resources may be improved.

As shown in FIG. 2, assuming that the consensus node 20A obtains a transaction execution record 201b after executing the transaction 200b, obtains a transaction execution record 201c after executing the transaction 200c, . . . , and obtains a transaction execution record 201n after executing the transaction 200n, then the transaction 200a, the transaction 200b, the transaction 200c, . . . , and the transaction 200n are in the current transaction pool 200, and the transaction execution record 201a, the transaction execution record 201b, the transaction execution record 201c, . . . , and the transaction execution record 201n are in a transaction execution data set 201. The consensus node 20A may periodically acquire a batch of transaction lists to be packed from the transaction pool 200 according to a relevant packing policy, for example, may acquire the transaction 200a, the transaction 200b, and the transaction 200c from the transaction pool 200 as a transaction list 202 to be packed, and accordingly, may acquire the initial transaction execution record corresponding to each transaction (that is, the transaction 200a, the transaction 200b, and the transaction 200c) in the transaction list 202 from the transaction execution data set 201 as to-be-processed transaction data 203 associated with the transaction list 202. At this time, the to-be-processed transaction data 203 specifically includes the transaction execution record 201a, the transaction execution record 201b, and the transaction execution record 201c. The packing policy may include at least one of a transaction time priority-based policy or a transaction commission priority-based policy.

Furthermore, the consensus node 20A may perform packing process on the transaction list 202 and the to-be-processed transaction data 203 to obtain a proposal block 204 that is to be subjected to block consensus with the consensus node 20B, then the proposal block 204 may be broadcast to the consensus node 20B, then the consensus node 20A and the consensus node 20B may jointly perform block consensus on the proposal block 204, and finally a block consensus result of the proposal block 204 is obtained. Each consensus node receiving the proposal block 204 may perform conflict detection on the proposal block 204 based on a conflict detection policy and vote, and then a final block consensus result may be obtained based on a voting result of each consensus node. The consensus node 20A, in a case that the block consensus result indicates a consensus success, may write the proposal block 204 after the consensus is reached to the blockchain corresponding to the blockchain network where the consensus node 20A is located. The proposal block 204 may include block header information and a block body. The block header information may include at least one of a parent block hash value, a block height, a version number, a timestamp, a difficulty value, a random number, or a Merkle tree root of the proposal block 204. The block body may include at least one of a transaction packed into the transaction list 202 of the proposal block 204, a transaction execution record in the to-be-processed transaction data 203, or a Merkle path composed of the transaction and a transaction hash value corresponding to the transaction execution record.

It may be seen from the above that, in an embodiment of the disclosure, for each consensus node in the blockchain network, the transaction may be executed first in response to receiving the transaction each time, and both the receipt and execution of the transaction may use concurrent logic. The transaction is added into the transaction pool after the execution of the transaction is ended, and meanwhile, the corresponding transaction execution record is added to the transaction execution data set associated with the transaction pool. Subsequently, the first consensus node packs the transaction to be packed together with the corresponding transaction execution record into a block for consensus, that is, in an embodiment of the disclosure, a transaction execution process and a consensus process are decoupled by advancing the transaction execution process before adding a transaction into the transaction pool, which may reduce the consensus duration consumed by the consensus process, so as not to occupy system resources in a consensus stage for a long time. Meanwhile, the utilization rate of the system resources may be improved by using the characteristics of concurrently receiving and concurrently executing transactions of the consensus node, the block production efficiency of the consensus node may be improved, and finally, the throughput of the blockchain is improved.

Figure 3:
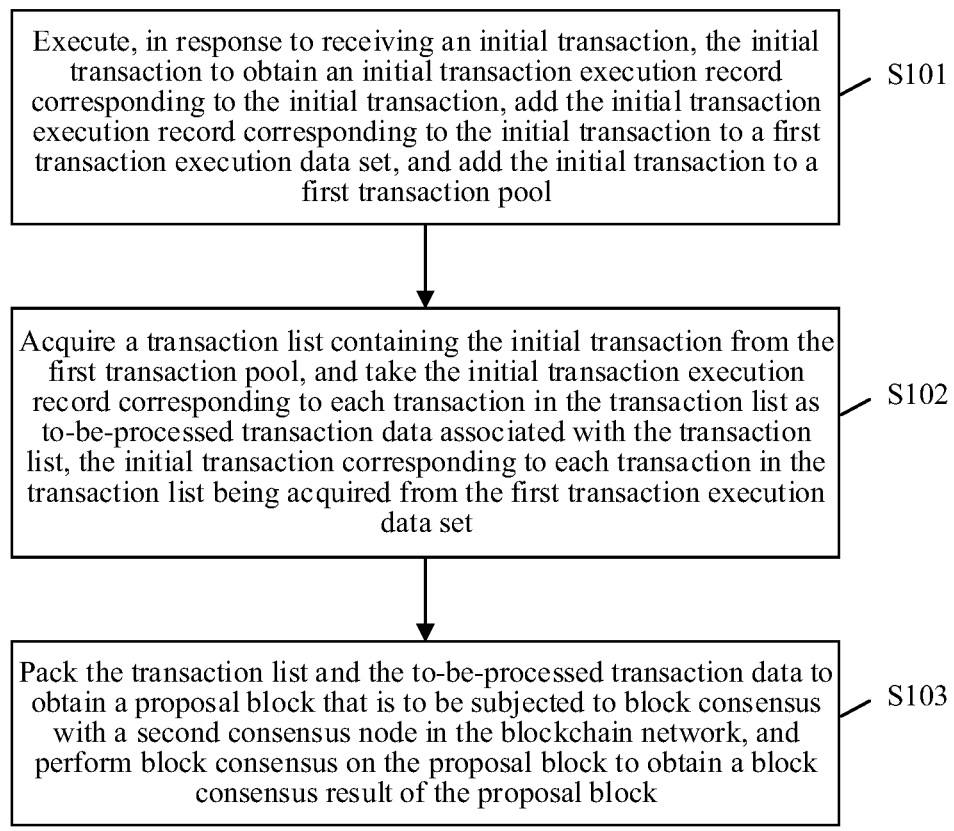
FIG. 3 is a schematic flowchart of a transaction data processing method provided by the embodiments of the disclosure.

FIG. 3 is a schematic flowchart of a transaction data processing method provided by the embodiments of the disclosure. As shown in FIG. 3, the method may be performed by a first consensus node in a blockchain network. The first consensus node may be either a server that accesses a blockchain network, or a terminal device that accesses the blockchain network. The first consensus node may be any one of the consensus nodes, for example, the node 10a, in the blockchain node system as shown in FIG. 1. The method may include at least the following steps S101 to S103:

Step S101: Execute, in response to receiving an initial transaction, the initial transaction to obtain an initial transaction execution record corresponding to the initial transaction, add the initial transaction execution record corresponding to the initial transaction to a first transaction execution data set, and add the initial transaction to a first transaction pool.

Specifically, the first consensus node, in response to receiving an initial transaction, may be configured to acquire an initial service contract used for executing the initial transaction, then may invoke the initial service contract to execute the initial transaction to obtain an initial transaction execution result corresponding to the initial transaction, may also acquire an initial transaction read-write set acquired after executing the transaction and a block height (that is, an initial block height) corresponding to a block that is acquired from a blockchain network in response to executing the initial transaction and that has a maximum generation timestamp, and then may take the initial transaction execution result corresponding to the initial transaction, the initial transaction read-write set, and the initial block height as the initial transaction execution record corresponding to the initial transaction. The initial service contract is a smart contract deployed in the blockchain network, and may be used for executing the initial transaction.

The initial transaction is a transaction request initiated by an application client on a terminal device. The application client here may be a client having a transaction function, such as a livestreaming application, a social application, an instant messaging application, a game application, a short video application, a video application, a music application, a shopping application, a novel application, and a payment application.

In some embodiments, in a case that the blockchain network where the first consensus node is located has a single-layer structure, the terminal device may directly transmit the initial transaction to the blockchain network, nodes in the blockchain network may broadcast each other after receiving the initial transaction, and finally all the consensus nodes (including the first consensus node) in the blockchain network may receive the initial transaction. Therefore, the initial transaction received by the first consensus node may be directly transmitted by the terminal device or may be broadcast by other nodes.

In some embodiments, in a case that the blockchain network where the first consensus node is located has a hierarchical structure, the blockchain network may be divided into a service network and a core consensus network. The blockchain network may further include a routing network (or referred to as a proxy network) for performing network isolation on the service network and the core consensus network. The terminal device that initiates the initial transaction may serve as a certain service node in the service network, or may serve as a terminal independent of the blockchain network. Therefore, the service node may directly transmit the initial transaction to the core consensus network, or the service node may first transmit the initial transaction to a routing node in the routing network, and then forward the initial transaction to the core consensus network through the routing node. Consensus nodes in the core consensus network may broadcast each other after receiving the initial transaction, and finally all the consensus nodes (including the first consensus node) in the core consensus network may receive the initial transaction.

Step S102: Acquire a transaction list containing the initial transaction from the first transaction pool, and take the initial transaction execution record corresponding to each transaction in the transaction list as to-be-processed transaction data associated with the transaction list, the initial transaction corresponding to each transaction in the transaction list being acquired from the first transaction execution data set.

Specifically, in addition to the initial transaction, the first transaction pool may also contain other transactions to be packed, and therefore, the first consensus node may obtain a transaction list to be packed from the first transaction pool. The transaction list may include one or more transactions. The transaction list may include initial transactions. Meanwhile, the first consensus node may also acquire the initial transaction execution record corresponding to each transaction in the transaction list from the first transaction execution data set, and may take these initial transaction execution records as to-be-processed transaction data associated with the transaction list.

Since the transaction capacity that may be contained in one block is limited, the first consensus node may acquire the transaction list from the first transaction pool based on a configured packing policy when a quantity of transactions to be packed in the first transaction pool is too large, resulting in that the transactions cannot be packed in one block. The packing policy may be a transaction time priority-based policy, that is, transactions are sorted according to transaction timestamps corresponding to all transactions, and the transaction with a small transaction timestamp is preferentially packed into the block. The packing policy may be a transaction commission priority-based policy, that is, transactions are sorted according to the commission paid for transaction, and the transaction with high commission is preferentially packed into the block. The transactions may also be sorted by combining a transaction time and the transaction commission, and the transaction with a comprehensively top is preferentially into the block. Of course, packing may also be performed by using other packing policies.

Step S103: Pack the transaction list and the to-be-processed transaction data to obtain a proposal block that is to be subjected to block consensus with a second consensus node in the blockchain network, and perform block consensus on the proposal block to obtain a block consensus result of the proposal block.

Specifically, the first consensus node may take the transaction in the transaction list as a transaction to be verified, then may perform a hash operation on the transaction to be verified and to-be-processed transaction data to obtain a transaction hash value associated with the transaction to be verified, and may determine a Merkle tree root corresponding to the transaction to be verified based on the transaction hash value. Meanwhile, the first consensus node may acquire a block having a target maximum generation timestamp from the blockchain network as a second target block, and may take a block hash value of the second target block as a parent block hash value of a next block of the second target block. After that, the first consensus node may generate a next block of the second target block based on the transaction to be verified, the to-be-processed transaction data, the Merkle tree root, and the parent block hash value, and take the next block of the second target block as a proposal block that is to be subjected to block consensus with the second consensus node in the blockchain network. The second target block here particularly refers to a block that is read from the blockchain corresponding to the blockchain network in response to packing by the first consensus node and that has a maximum generation timestamp. The maximum generation timestamp may be referred to as the target maximum generation timestamp. The generation timestamp of the proposal block may be used for updating the maximum generation timestamp on the blockchain. The second target block and the first target block may be the same block or may be different blocks. The first consensus node may also perform a hash operation on the transaction to be verified to obtain the transaction hash value associated with the transaction to be verified, and then the Merkle tree root corresponding to the transaction to be verified may be determined based on the transaction hash value.

In some embodiments, the first consensus node may perform conflict detection on the proposal block based on a conflict detection policy to obtain a first consensus result. Meanwhile, the first consensus node may broadcast the proposal block to the second consensus node, so that the second consensus node may also perform conflict detection on the proposal block based on the conflict detection policy to obtain a second consensus result. Finally, the first consensus node may receive the second consensus result returned by the second consensus node and take the first consensus result and the second consensus result as a block consensus result of the proposal block. A specific process of the conflict detection may refer to subsequent description in the embodiment corresponding to FIG. 6.

In the transaction data processing method provided by the disclosure, the first consensus node in the blockchain network, in response to receiving an initial transaction, may execute the initial transaction first to obtain an initial transaction execution record corresponding to the initial transaction, then add the initial transaction execution record corresponding to the initial transaction to a first transaction execution data set associated with a first transaction pool of the first consensus node, meanwhile, add the initial transaction to the first transaction pool, then the first consensus node may acquire a transaction list containing the initial transaction from the first transaction pool, and may acquire the initial transaction execution record corresponding to each transaction in the transaction list from the first transaction execution data set, that is, acquire to-be-processed transaction data associated with the transaction list, then the transaction list and the to-be-processed transaction data may be packed to obtain a proposal block, and then the proposal block may be broadcast to the second consensus node in the blockchain network, so that the second consensus node and the first consensus node respectively perform block consensus on the proposal block, and finally a block consensus result of the proposal block is obtained. It may be seen therefrom that, for each consensus node in the blockchain network, the transaction may be executed first in response to receiving the transaction each time, and both the receipt and execution of the transaction may use concurrent logic. The transaction is added into the transaction pool after the execution of the transaction is ended, and meanwhile, the corresponding transaction execution record is added to the transaction execution data set associated with the transaction pool. Subsequently, the first consensus node packs the transaction to be packed together with the corresponding transaction execution record into a block for consensus, that is, in an embodiment of the disclosure, a transaction execution process and a consensus process are decoupled by advancing the transaction execution process before adding a transaction into the transaction pool, which may reduce the consensus duration consumed by the consensus process, so as not to occupy system resources in a consensus stage for a long time. In addition, the utilization rate of the system resources may be improved by using the characteristics of concurrently receiving and concurrently executing transactions of the consensus node, and the block production efficiency of the consensus node may be improved. In addition, while meeting consensus data consistency, the time loss caused by executing all transactions in the block in the consensus process may be reduced, and finally, the overall external throughput of the blockchain network may be improved.

In some embodiments, the operation of receiving an initial transaction in response to receiving the initial transaction to obtain an initial transaction execution record corresponding to the initial transaction includes: acquiring an initial service contract for executing the initial transaction in response to receiving the initial transaction; reading an initial read data set corresponding to the initial transaction from a blockchain network based on the initial service contract; executing the initial transaction based on the initial read data set to obtain an initial transaction execution result corresponding to the initial transaction; writing the initial transaction execution result into an initial write data set corresponding to the initial transaction, and taking the initial read data set and the initial write data set as an initial transaction read-write set corresponding to the initial transaction; taking a block that is acquired in response to executing the initial transaction and that has an initial maximum generation timestamp as a first target block, and taking a block height of the first target block as an initial block height; and taking the initial transaction execution result, the initial transaction read-write set, and the initial block height as the initial transaction execution record corresponding to the initial transaction.

Specifically, after obtaining the initial service contract for executing the initial transaction, the first consensus node may invoke, based on the initial service contract, a virtual machine corresponding to the first consensus node to read an initial read data set corresponding to the initial transaction from the blockchain network, then may invoke the virtual machine to execute the initial transaction based on the initial read data set to obtain an initial transaction execution result corresponding to the initial transaction, then may write the initial transaction execution result into an initial write data set corresponding to the initial transaction, and then may take the initial read data set and the initial write data set as an initial transaction read-write set corresponding to the initial transaction. The initial read data set may be stored in a storage layer of the first consensus node. The storage layer of each node in the blockchain network may include a local cache and a local storage. The read and write speed of the local cache is relatively high. Therefore, the blockchain node may preferentially perform a read/write operation in the local cache, which may improve the overall performance of the blockchain network. The local storage is used for persistent storage of data (for example, a block). A blockchain node may first write data that needs to be stored into a corresponding local cache. However, considering the limitation of the local cache (for example, a power failure may result in data loss), subsequently, relevant data may be gradually written into the local storage (for example, a local database) through an asynchronous write operation, so as to finally guarantee the reliability and persistence of the data. Therefore, the first consensus node may, based on the initial service contract, invoke the virtual machine corresponding to the first consensus node to read the initial read data set corresponding to the initial transaction from the local cache of the first consensus node first, and may further try reading the initial read data set corresponding to the initial transaction from the local storage of the first consensus node in a case that the reading in the local cache of the first consensus node fails.

In some embodiments, the first consensus node may invoke, based on the acquired initial read data set, the virtual machine corresponding to the first consensus node to execute the initial transaction to obtain an initial transaction execution result corresponding to the initial transaction, then may write the initial transaction execution result into the initial write data set corresponding to the initial transaction, and finally may take the initial read data set and the initial write data set as the initial transaction read-write set corresponding to the initial transaction. The first consensus node may create an empty initial write data set in advance, and then write the initial transaction execution result into the initial write data set in response to executing the initial transaction to obtain the corresponding initial transaction execution result. The initial write data set may also be associated with the initial read data set and stored in the storage layer of the first consensus node. Corresponding transaction read cache and a transaction write cache may be created, based on the local cache of the first consensus node, for each transaction received by the first consensus node. One transaction corresponds to one transaction write cache and one transaction read cache, that is, the first consensus node may acquire an initial read data set corresponding to the initial transaction from the transaction read cache corresponding to the initial transaction, then may add an initial transaction execution result obtained by executing the initial transaction to the transaction write cache corresponding to the initial transaction, and construct to obtain an initial write data set corresponding to the initial transaction based on the data stored in the transaction write cache.

In some embodiments, the first consensus node, in response to executing the above initial transaction, may take the block that is acquired from the blockchain network and that has the initial maximum generation timestamp as a first target block, and take a block height of the first target block as an initial block height, that is, the first consensus node may take the latest block height of an account book read in response to executing the initial transaction as the initial block height. The first target block here particularly refers to a block that is read from the local cache of the first consensus node in response to executing the initial transaction by the first consensus node and that has a maximum generation timestamp. In order to facilitate subsequent differentiation, the maximum generation timestamp may be referred to as an initial maximum generation timestamp.

The block height is an identifier of a block, which is used for measuring a distance from a certain block to a first block in a blockchain. A position of a certain block on the chain may be accurately known through the block height, which is equivalent to locating a coordinate for the block. For example, assuming that there are five blocks in the blockchain stored by the first consensus node, the block height of the first block is 0, the block height of the second block is 1, . . . , by analogy, and the block height of the fifth block is 4. Since the block having the initial maximum generation timestamp in the blockchain is the fifth block at this time, the fifth block is the first target block, and correspondingly, the current latest block height (that is, the initial block height) is 4.

In some embodiments, the blockchain may be bifurcated in special cases, and the first consensus node may select a blockchain having a longest branch as a valid blockchain, and the reading of data (for example, acquiring the initial block height) is still performed on the valid blockchain.

In a case that data needs to be read, although each consensus node in a blockchain network may acquire corresponding data from a commonly maintained blockchain (or an account book), such as a transaction execution result, a read data set, a block, and the like, since the broadcast of the data is easily affected by a network transmission delay, there will be a time difference in data update (for example, the addition of a new block) of a storage layer of each consensus node, that is, an advanced consensus node with a strong computing capability and a small transmission delay has a high data update speed. Therefore, the data in the storage layer of the node is relatively new. However, a behindhand consensus node with a weak computing capability and a large transmission delay has a low data update speed. Therefore, the data in the storage layer of the node is relatively old. It may be seen therefrom that the latest block heights acquired from corresponding storage layers may also be inconsistent in a case that different consensus nodes execute the same transaction. For example, for a consensus node 1, the latest block height read by the consensus node 1 from a local cache thereof is 4 in response to executing a transaction A. For a consensus node 2, the latest block height read by the consensus node 2 from a local cache thereof is 3 in response to executing the transaction A. It may be seen that the block update of the consensus node 2 lags behind that of the consensus node 1.

In some embodiments, the first consensus node may take the initial transaction execution result, the initial transaction read-write set, and the initial block height corresponding to the initial transaction as the initial transaction execution record corresponding to the initial transaction, and then may add the initial transaction execution record corresponding to the initial transaction to the first transaction execution data set and add the initial transaction to the first transaction pool of the first consensus node. Any one or more pieces of data of the initial transaction execution result, the initial transaction read-write set, and the initial block height may also be taken as the initial transaction execution record corresponding to the initial transaction. The first transaction execution data set is associated with the first transaction pool, and the first transaction execution data set is used for recording the initial transaction execution record corresponding to each transaction received by the first consensus node. For example, in FIG. 2, in a case that the transaction 200$a$ is taken as an initial transaction, the transaction execution record 201$a$ obtained after the consensus node 20A executes the transaction 200$a$ will be taken as an initial transaction execution record corresponding to the initial transaction. The transaction execution record 201$a$ may include an initial transaction execution result, an initial transaction read-write set, and an initial block height corresponding to the transaction 200$a$. Similarly, the consensus node 20A may also obtain corresponding transaction execution records (for example, the transaction execution record 201$b$, the transaction execution record 201$c$, and the transaction execution record 201$n$) after executing other received transactions (for example, the transaction 200$b$, the transaction 200$c$, and the transaction 200$n$).

An embodiment of the disclosure is described by only taking the execution of the initial transaction as an example. The first consensus node may also receive other transactions. The processing processes for these transactions are consistent with the processing process for the initial transaction. The first consensus node may concurrently receive a plurality of transactions, or may concurrently execute a plurality of transactions. In addition to the first consensus node, other consensus nodes (such as the second consensus node) in the blockchain network may also concurrently receive and concurrently execute a plurality of transactions. Therefore, by making full use of logic for concurrently receiving and processing transactions, the utilization rate of CPU computing resources and I/O resources may be improved, thereby improving the overall utilization rate of system resources.

In the above embodiment, the initial transaction execution result, the initial transaction read-write set, and the initial block height are taken as the initial transaction execution record corresponding to the initial transaction, so that the initial transaction execution record covers more information related to the execution of the transaction, and the richness of the information covered by the initial transaction execution record is improved.

In some embodiments, the operation of packing a transaction list and to-be-processed transaction data to obtain a proposal block that is to be subjected to block consensus with a second consensus node in a blockchain network includes: taking a transaction in the transaction list as a transaction to be verified, and performing a hash operation on the transaction to be verified and the to-be-processed transaction data to obtain a Merkle tree root corresponding to the transaction to be verified; acquiring a block with a target maximum generation timestamp from the blockchain network to obtain a second target block; and generating the proposal block that is to be subjected to block consensus with the second consensus node in the blockchain network based on the transaction to be verified, the to-be-processed transaction data, the Merkle tree root, and the block hash value of the second target block. The first consensus node may perform the hash operation on the transaction to be verified to obtain a first hash value, simultaneously, may perform the hash operation on the to-be-processed transaction data to obtain a second hash value, and then may perform the hash operation on the first hash value and the second hash value again to obtain a transaction hash value associated with the transaction to be verified.

In some embodiments, the first consensus node may also directly perform the hash operation on the transaction to be verified and the to-be-processed transaction data to obtain the transaction hash value associated with the transaction to be verified. Finally, the first consensus node may determine the Merkle tree root corresponding to the transaction to be verified based on the transaction hash value.

Figure 4:
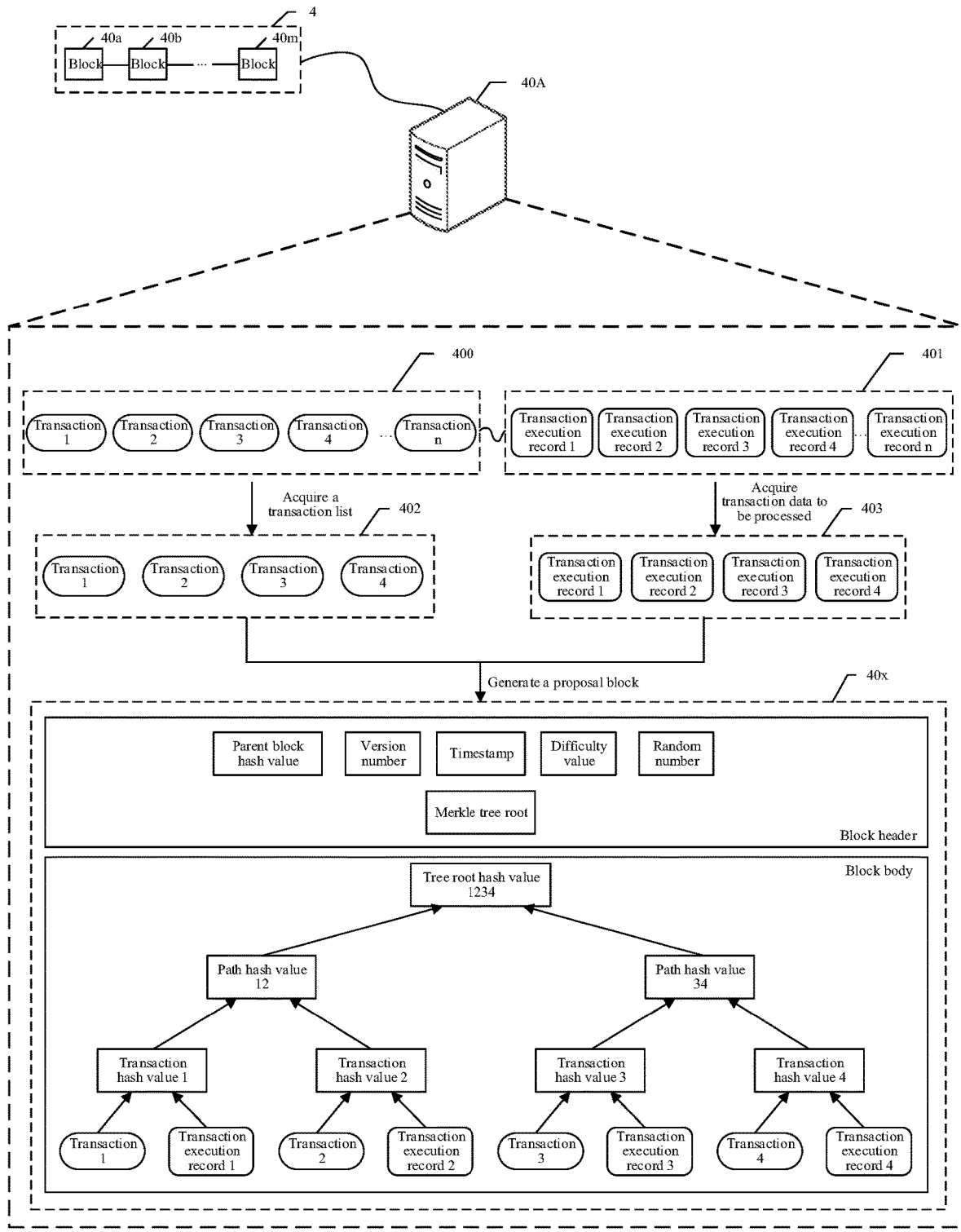
FIG. 4 is a schematic diagram of a scene for generating a proposal block provided by the embodiments of the disclosure.

FIG. 4 is a schematic diagram of a scene for generating a proposal block provided by the embodiments of the disclosure. As shown in FIG. 4, a consensus node 40A in an embodiment of the disclosure may be a first consensus node in a blockchain network. The consensus node 40A may be any consensus node in the blockchain node system shown in FIG. 1 above, for example, a node 10a.

The blockchain 4 shown in FIG. 4 may be a blockchain in the above blockchain network shown in FIG. 1. The blockchain 4 may be an identical blockchain shared by each consensus node in the blockchain network that the consensus node 40A belongs. Each consensus node may acquire information stored in the blockchain in the blockchain 4. The blockchain 4 includes a block 40a, a block 40b, ..., and a block 40m. The block 40a may be referred to as a genesis block of the blockchain 4.

The transaction pool 400 (that is, the first transaction pool) shown in FIG. 4 may store a plurality of transactions received by the consensus node 40A. The plurality of transactions may specifically include a transaction 1, a transaction 2, a transaction 3, a transaction 4, ..., a transaction n, and n here is a positive integer. The transaction 2 may be an initial transaction initiated by an application client on a certain terminal device.

Before placing the transactions into the transaction pool, the consensus node 40A may execute each received transaction to obtain initial transaction execution records respectively corresponding to all transactions, and add these initial transaction execution records to a transaction execution data set 401 (that is, a first transaction execution data set) associated with the transaction pool 400. These initial transaction execution records may specifically include a transaction execution record 1 corresponding to the transaction 1, a transaction execution record 2 corresponding to the transaction 2, a transaction execution record 3 corresponding to the transaction 3, ..., and a transaction execution record n corresponding to the transaction n.

Further, the consensus node 40A may acquire a transaction list for packing from the transaction pool 400 and take the transactions in the transaction list as transactions to be verified, for example, the transaction 1, the transaction 2, the transaction 3, and the transaction 4 in the transaction list 402 may all be collectively referred to as the transactions to be verified. Meanwhile, the consensus node 40A may acquire the initial transaction execution records corresponding to all transactions in the transaction list from the transaction execution data set 401 and take these initial transaction execution records as to-be-processed transaction data associated with the transaction list. For example, the transaction execution record 1, the transaction execution record 2, the transaction execution record 3, and the transaction execution record 4 in the to-be-processed transaction data 403 may all be collectively referred to as the to-be-processed transaction data. Further, the consensus node 40A may respectively perform a hash operation on each transaction in the transaction list 402 and the initial transaction execution record corresponding to the transaction in the to-be-processed transaction data 403 to obtain a corresponding transaction hash value. For example, a hash operation may be performed on the transaction 1 and the transaction execution record 1 to obtain a transaction hash value 1; or, the hash operation may also be performed on the transaction 1 to obtain a first hash value 1, simultaneously, the hash operation may also be performed on the transaction execution record 1 to obtain a second hash value 1, and then the hash operation may also be performed on the first hash value 1 and the second hash value 1 to obtain the transaction hash value 1; the hash operation may be performed on the transaction 2 and the transaction execution record 2 to obtain a transaction hash value 2; or, the hash operation may also be performed on the transaction 2 to obtain a first hash value 2, simultaneously, the hash operation may also be performed on the transaction execution record 2 to obtain a second hash value 2, and then the hash operation may also be performed on the first hash value 2 and the second hash value 2 to obtain the transaction hash value 2; the hash operation may be performed on the transaction 3 and the transaction execution record 3 to obtain a transaction hash value 3; or, the hash operation may also be performed on the transaction 3 to obtain a first hash value 3, simultaneously, the hash operation may also be performed on the transaction execution record 3 to obtain a second hash value 3, and then the hash operation may also be performed on the first hash value 3 and the second hash value 3 to obtain the transaction hash value 3; the hash operation may be performed on the transaction 4 and the transaction execution record 4 to obtain a transaction hash value 4; or, the hash operation may also be performed on the transaction 4 to obtain a first hash value 4, simultaneously, the hash operation may also be performed on the transaction execution record 4 to obtain a second hash value 4, and then the hash operation may also be performed on the first hash value 4 and the second hash value 4 to obtain the transaction hash value 4.

Further, the consensus node 40A may determine the Merkle tree root corresponding to the transaction to be verified based on the transaction hash value 1, the transaction hash value 2, the transaction hash value 3, and the transaction hash value 4. For example, the consensus node 40A may perform the ash operation on the transaction hash value 1 and the transaction hash value 2 to obtain a path hash value 12 containing the two transaction hash values. The hash operation is performed on the transaction hash value 3 and the transaction hash value 4 to obtain a path hash value 34 containing the two transaction hash values. Finally, the hash operation may be performed on the path hash value 12 and the path hash value 34 to obtain a tree root hash value 1234 containing the two path hash values, and then the tree root hash value 1234 may be taken as the Merkle tree root corresponding to the transaction to be verified.

Further, the consensus node 40A may acquire a block with a target maximum generation timestamp as a second target block (for example, a block 40m) from the blockchain 4 shown in FIG. 4, and then may take a block hash value of the block 40m as a parent block hash value of a next block of the block 40m. At this time, the consensus node 40A may generate the next block of the block 40m based on the transaction to be verified, the to-be-processed transaction data, the Merkle tree root, and the parent block hash value, and take the generated next block of the second target block as a proposal block to be written into the blockchain 4 (for example, a proposal block 40x). The proposal block 40x here may be used for updating the maximum generated timestamp on the blockchain 4. As shown in FIG. 4, the proposal block may include block header information and a block body. The block header information may include a parent block hash value, a version number, a timestamp, a difficulty value, a random number, a Merkle tree root, and the like. The block body may store the transaction to be verified and the to-be-processed transaction data packed by the consensus node 40A, and a Merkle path formed by the transaction hash value obtained based on the transaction to be verified and the to-be-processed transaction data.

In the above embodiment, the proposal block that is to be subjected to block consensus with the second consensus node in the blockchain network is generated based on the transaction to be verified, the to-be-processed transaction data, the Merkle tree root, and the block hash value of the second target block, so that the proposal block includes the block hash value of the second target block, thereby facilitating the block consensus on the proposal block by the second consensus node.

In some embodiments, the operation of performing block consensus on the proposal block to obtain a block consensus result of the proposal block includes: performing conflict detection on the proposal block based on a conflict detection policy to obtain a first consensus result; broadcasting the proposal block to the second consensus node, so that the second consensus node performs the conflict detection on the proposal block based on the conflict detection policy to obtain a second consensus result; and receiving the second consensus result returned by the second consensus node, and taking the first consensus result and the second consensus result as a block consensus result of the proposal block.

The conflict detection may include, but is not limited to, one or more of the following modes listed below: verifying block signature information of a proposal block, verifying the Merkle tree root in the proposal block, verifying whether the proposal block complies with a blockchain chain principle, verifying whether the proposal block complies with a proposal rule, performing validity verification on a transaction list in the proposal block, performing local verification on a transaction execution record (that is, the to-be-processed transaction data) corresponding to each transaction in the proposal block, performing association verification on the transaction list in the proposal block, and performing read-write set conflict detection. The block signature information is obtained by a first consensus node signing the proposal block through a node private key of the first consensus node.

Specifically, the first consensus node may perform conflict detection and voting on the proposal block based on the conflict detection policy, so as to obtain a first consensus result. The process of performing the conflict detection on the proposal block by the first consensus node is consistent with the process of performing the conflict detection on the proposal block by the second consensus node. Therefore, a specific process of this step may refer to the process of performing the conflict detection on the proposal block by the second consensus node.

In some embodiments, the second consensus node may verify the block signature information of the proposal block. Specifically, the second consensus node may acquire the block signature information of the proposal block, acquire a node public key corresponding to the node private key, and perform block signature verification on the block signature information based on the node public key to obtain a block signature verification result, and determine a second consensus result corresponding to the proposal block based on the block signature verification result. The second consensus node may vote against the proposal block in a case that the block signature verification result indicates a signature verification failure, that is, the block signature does not pass the verification.

In some embodiments, the second consensus node may verify the Merkle tree root in the proposal block, that is, verify whether the Merkle tree root in the proposal block is calculated from the transactions in the transaction list and the corresponding initial transaction execution records. Specifically, the second consensus node may perform a hash operation on the transaction in the transaction list and the to-be-processed transaction data of the proposal block to obtain a hash value to be verified, and may determine a tree root to be verified based on the hash value to be verified. The second consensus node may compare the tree root to be verified with the Merkle tree root in the proposal block to obtain a tree root comparison result, and may determine a second consensus result corresponding to the proposal block based on the tree root comparison result. The second consensus node may vote against the proposal block in a case that the root comparison result indicates that the tree root to be verified is different from the Merkle tree root.

In some embodiments, the second consensus node may verify whether the proposal block complies with the blockchain chain principle, that is, verify whether a preamble block of the proposal block is the current latest block of the second consensus node. Specifically, the second consensus node may acquire a block hash value of a parent block (that is, the preamble block) of the proposed block from the blockchain as a target parent block hash value, may acquire a parent block hash value from the proposal block, compare the target parent block hash value with the parent block hash value to obtain a hash value comparison result, and may determine a second consensus result corresponding to the proposal block based on the hash value comparison result. The second consensus node may vote against the proposal block in a case that the hash value comparison result indicates that the target parent block hash value is different from the parent block hash value.

In some embodiments, the second consensus node may verify whether the proposal block complies with a proposal rule, for example, may verify whether the first consensus node is a correct master node (that is, a proposal node), and may determine a second consensus result corresponding to the proposal block based on the obtained node verification result. The second consensus node may vote against the proposal block in a case that the node verification result indicates that the first consensus node is not the correct proposal node.

In some embodiments, the second consensus node may perform validity verification on the transaction list in the proposal block, that is, perform validity checking on each transaction in the transaction list, including transaction signature verification and double spending verification to obtain a target validity verification result, and may determine a second consensus result corresponding to the proposal block based on the target validity verification result. The second consensus node may vote against the proposal block in a case that the target validity verification result indicates that there are transactions with signature verification furniture or transactions with double spending attacks in the transaction list.

In the above embodiment, the conflict detection is performed on the proposal block based on the conflict detection policy to obtain a block consensus result, which improves the accuracy of the block consensus.

In some embodiments, the method further includes: determining that a consensus on a proposal block is reached in a case that a block consensus result indicates a consensus success; writing the proposal block after reaching the consensus as a third target block into a blockchain corresponding to a blockchain network; and updating an account state version number corresponding to a transaction object associated with a transaction list.

Specifically, the consensus on the proposal block is determined in a case that the block consensus result indicates a consensus success. The first consensus node may write the proposal block after reaching the consensus as the third target block into the blockchain corresponding to the blockchain network. For example, as shown in FIG. 4, after the proposal block 40x passes the block consensus, the consensus node 40A may take the proposal block 40x as the third target block and may write the proposal block 40x into the blockchain 4, that is, the proposal block 40x may be added to the blockchain 4 as the next block of the block 40m. It is to be understood that the proposal block after reaching the consensus and a corresponding transaction execution result may be written into a local cache and local storage of each consensus node.

In some embodiments, the proposal block may be discarded in a case that the block consensus result indicates a consensus failure, then a consensus node may be re-selected as a packing node (that is, the first consensus node) in the blockchain network for packing, and then a new round of block consensus may be started on the newly obtained proposal block.

In some embodiments, the first consensus node may update the account state version number corresponding to the transaction object associated with each transaction in the transaction list, that is, update the account state version number corresponding to the relevant transaction object of an account book layer affected by the transaction to be verified. The first consensus node will write the account state version number corresponding to the transaction object associated with the transaction into a write data set corresponding to the transaction in response to executing a certain transaction. The transaction object may refer to a user participating in a transaction. The account state version number may be used for characterizing an account state corresponding to the transaction object. At a certain block height, the account state version numbers corresponding to the same transaction object are the same. The account state version number associated with the transaction needs to be updated after successfully executing one transaction each time and uploading relevant data. A state (for example, based on the latest block height in the current blockchain) in which an executing operation is performed on the corresponding transaction may be known by recording a relevant account state version number, so that the conflict detection may be performed based on the recorded account state version number. In an embodiment of the disclosure, an account state version number associated with the transaction may be acquired and written into a write data set corresponding to the transaction in a case that each consensus node performs one transaction in advance. The account state version number may be a string of increasing integers that are incremented by 1 after each update. For example, assuming that the transaction 1 indicates that a transaction object A performs virtual asset transfer to a transaction object B, an account state version number corresponding to the transaction object A and an account state version number corresponding to the transaction object B will both be written into a write data set corresponding to the transaction 1 in response to performing the transaction 1 by the first consensus node (such as node C). After passing relevant conflict detection subsequently, the first consensus node may update both the account state version number corresponding to the transaction object A and the account state version number corresponding to the transaction object B, for example, increasing the account state version number corresponding to the transaction object A by 1. Meanwhile, the account state version number corresponding to the transaction object B is increased by 1.

In the above embodiment, in a case of a consensus success, the account state version number corresponding to the transaction object associated with the transaction list is updated, so that the account state version number is updated in time.

In some embodiments, the method further includes: performing validity verification on the initial transaction to obtain a validity verification result; determining, in a case that the validity verification result indicates that the transaction is valid, that the initial transaction passes the validity verification, and broadcasting the initial transaction after passing the validity verification to the second consensus node, so that the second consensus node executes the initial transaction after passing the validity verification.

Specifically, the first consensus node may perform validity verification on each received transaction. Taking an initial transaction as an example, after receiving the initial transaction, the first consensus node may acquire transaction signature information of the initial transaction and a device public key of a terminal device that transmits the initial transaction, and then may perform transaction signature verification on the transaction signature information based on the device public key to obtain a transaction signature verification result. The transaction signature information is obtained after the terminal device signs the initial transaction through a device private key corresponding to the device public key. The first consensus node may obtain a validity verification result corresponding to the initial transaction based on the transaction signature verification result, for example, the transaction signature verification result may be determined as the validity verification result corresponding to the initial transaction. In some embodiments, it may be determined that the initial transaction passes the validity verification in a case that the obtained validity verification result indicates that the transaction is valid, so that the first consensus node may broadcast the initial transaction that passes the validity verification to the second consensus node to enable the second consensus node to execute the initial transaction that passes the validity verification. It is to be understood that a processing process for the transaction by the second consensus node is consistent with the processing process for the transaction by the first consensus node.

In the above embodiment, the initial transaction that passes the validity verification is broadcast to the second consensus node in a case that the initial transaction passes the validity verification, which avoids the resource waste caused by performing invalid broadcasting on the initial transaction in a case that the initial transaction does not pass the validity verification, and improves the utilization rate of resources.

In some embodiments, the operation of performing validity verification on the initial transaction to obtain a validity verification result includes: acquiring transaction signature information of the initial transaction and a device public key of a terminal device that transmits the initial transaction, and performing transaction signature verification on the transaction signature information based on the device public key to obtain the transaction verification result, the transaction signature information being obtained after the terminal device signs the initial transaction through the device private key corresponding to the device public key; performing double spending verification on the initial transaction to obtain a double spending verification result; and taking the transaction verification result and the double spending verification result as the validity verification result corresponding to the initial transaction.

Specifically, the first consensus node may perform double spending verification (which may also be referred to as double payment determination) on the initial transaction to obtain the double spending verification result. The double spending verification is used for verify whether the same virtual asset is reused, that is, verifying whether there is a double spending attack. For example, the first consensus node may acquire a transaction timestamp corresponding to the initial transaction, then may search whether there is a repeated transaction before the transaction timestamp in a first transaction pool, may search in a blockchain to be uploaded in a case that there is no repeated transaction before the transaction timestamp in the first transaction pool, and may continue to search in the blockchain until the double spending verification result is finally obtained in a case that there is still no repeated transaction.

In some embodiments, the first consensus node may take the transaction verification result and the double spending verification result as the validity verification result corresponding to the initial transaction.

In the above embodiment, the transaction verification result and the double spending verification result are taken as the validity verification result corresponding to the initial transaction, which improves the reliability of the validity verification result.

In some embodiments, the method further includes: determining that the validity verification result indicates that the transaction is valid in a case that the transaction signature verification result indicates a signature verification success and the double spending verification result indicates that there is no double spending attack.

Specifically, it is determined that the validity verification result indicates that the transaction is valid in a case that the transaction signature verification result indicates a signature verification success and the double spending verification result indicates that there is no double spending attack.

In some embodiments, it may be determined that the validity verification result indicates that the transaction is valid in a case that the transaction signature verification result indicates that a signature verification failure or the double spending verification result indicates that there is a double spending attack, and then the first consensus node may generate a transaction failure notification and return the transaction failure notification to the terminal device that transmits the initial transaction.

In the above embodiment, it is to be determined that the validity verification result indicates that the transaction is valid in a case that the transaction signature verification result indicates a signature verification success and the double spending verification result indicates that there is no double spending attack, so as to accurately determine whether the transaction is valid.

Figure 5:
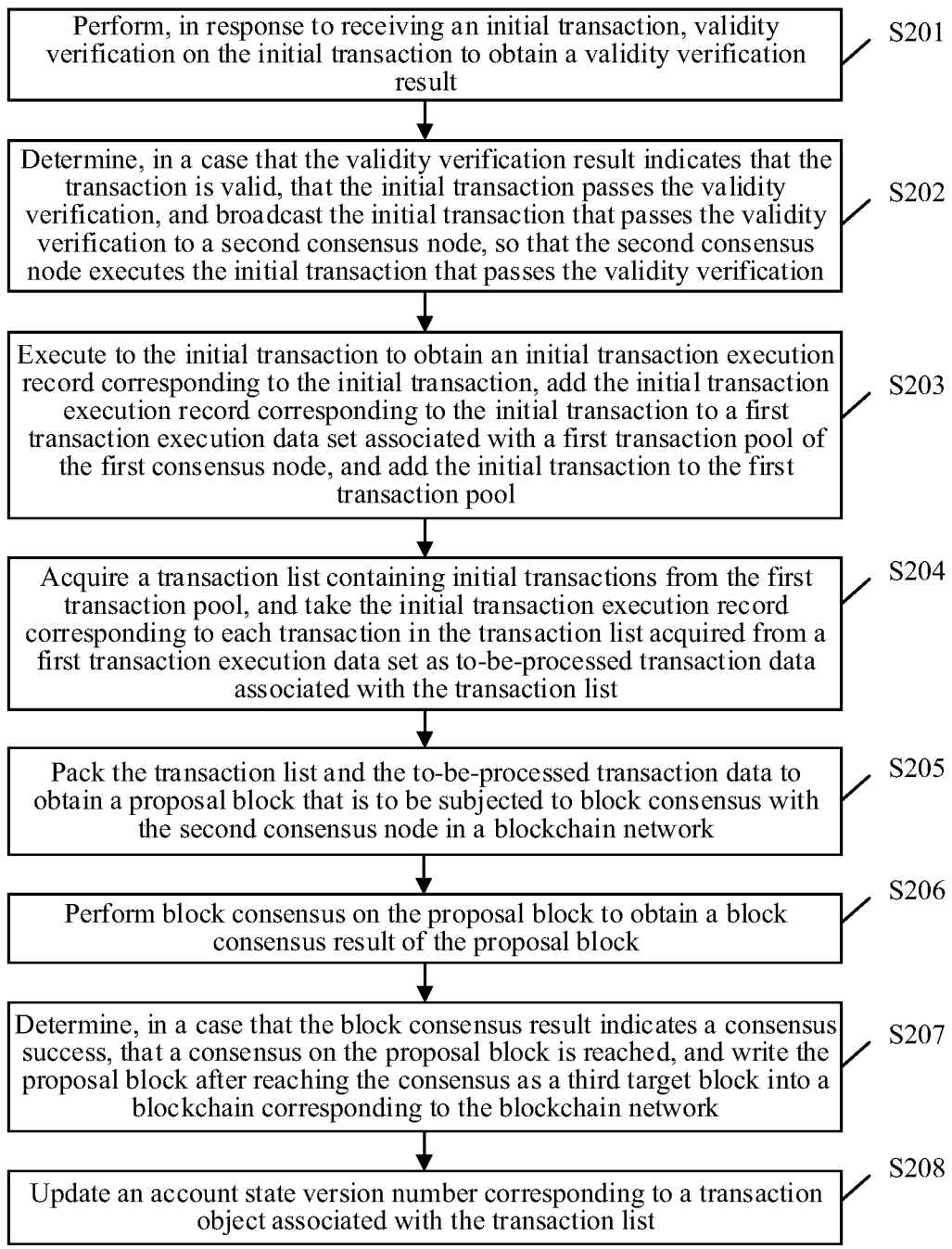
FIG. 5 is a schematic flowchart of a transaction data processing method provided by the embodiments of the disclosure.

FIG. 5 is a schematic flowchart of a transaction data processing method provided by the embodiments of the disclosure. As shown in FIG. 5, the method may be performed by a first consensus node in a blockchain network. The first consensus node may be either a server that accesses a blockchain network, or a terminal device that accesses the blockchain network. The first consensus node may be any one of the consensus nodes, for example, the node 10a, in the blockchain node system as shown in FIG. 1. The method may include at least the following steps:

Step S201: Perform, in response to receiving an initial transaction, validity verification on the initial transaction to obtain a validity verification result.

Step S202: Determine, in a case that the validity verification result indicates that the transaction is valid, that the initial transaction passes the validity verification, and broadcast the initial transaction that passes the validity verification to a second consensus node, so that the second consensus node executes the initial transaction that passes the validity verification.

Step S203: Execute to the initial transaction to obtain an initial transaction execution record corresponding to the initial transaction, add the initial transaction execution record corresponding to the initial transaction to a first transaction execution data set associated with a first transaction pool of the first consensus node, and add the initial transaction to the first transaction pool.

Specifically, the first consensus node may execute the initial transaction that passes the validity verification in a case that the initial transaction passes the validity verification.

Step S204: Acquire a transaction list containing initial transactions from the first transaction pool, and take the initial transaction execution record corresponding to each transaction in the transaction list acquired from a first transaction execution data set as to-be-processed transaction data associated with the transaction list.

Step S205: Pack the transaction list and the to-be-processed transaction data to obtain a proposal block that is to be subjected to block consensus with the second consensus node in a blockchain network.

Step S206: Perform block consensus on the proposal block to obtain a block consensus result of the proposal block.

Step S207: Determine, in a case that the block consensus result indicates a consensus success, that a consensus on the proposal block is reached, and write the proposal block after reaching the consensus as a third target block into a blockchain corresponding to the blockchain network.

Step S208: Update an account state version number corresponding to a transaction object associated with the transaction list.

It may be seen from the above that, in an embodiment of the disclosure, for each consensus node in the blockchain network, the transaction may be executed first in response to receiving the transaction each time, and both the receipt and execution of the transaction may use concurrent logic, that is, a plurality of transactions may be received simultaneously or executed simultaneously. The transaction is added into the transaction pool after the execution of the transaction is ended, and meanwhile, the corresponding transaction execution record is added to the transaction execution data set associated with the transaction pool. Subsequently, the first consensus node packs the transaction to be packed together with the corresponding transaction execution record into a block for consensus, that is, in an embodiment of the disclosure, a transaction execution process and a consensus process are decoupled by advancing the transaction execution process before adding a transaction into the transaction pool, which may reduce the consensus duration consumed by the consensus process, and meanwhile, may improve the utilization rate of the system resources by using the characteristics of concurrently receiving and concurrently executing transactions of the consensus node, thereby improving the throughput of the blockchain.

In some embodiments, a schematic flowchart of a transaction data processing method is provided. The method may be performed by a second consensus node in a blockchain network. The method includes: receiving a proposal block broadcast by a first consensus node in a blockchain network, the proposal block being obtained by the first consensus node by packing a transaction list and to-be-processed transaction data associated with the transaction list; the transaction list being acquired by the first consensus node from the first transaction pool of the first consensus node, and the transaction list containing an initial transaction, and the to-be-processed transaction data including an initial transaction execution record corresponding to each transaction in the transaction list in the first transaction execution data set; the first transaction execution data set being used for recording the initial transaction execution record corresponding to each transaction received by the first consensus node; the initial transaction execution record corresponding to the initial transaction being added to the first transaction execution data set by the first consensus node, and the initial transaction execution record corresponding to the initial transaction being obtained by the first consensus node by executing the initial transaction in response to receiving the initial transaction; and performing conflict detection on the proposal block based on a conflict detection policy to obtain a second consensus result of the proposal block, and returning the second consensus result to the first consensus node.

Specifically, the second consensus node may receive the proposal block broadcast by the first consensus node in the blockchain network, and then may perform conflict detect the proposal block based on the conflict detection policy to obtain a second consensus result of the proposal block.

In an embodiment of the disclosure, for each consensus node in the blockchain network, the transaction may be executed first in response to receiving the transaction each time, and both the receipt and execution of the transaction may use concurrent logic. The transaction is added into the transaction pool after the execution of the transaction is ended, and meanwhile, the corresponding transaction execution record is added to the transaction execution data set associated with the transaction pool. Subsequently, the first consensus node packs the transaction to be packed together with the corresponding transaction execution record into a block for consensus, that is, in an embodiment of the disclosure, a transaction execution process and a consensus process are decoupled by advancing the transaction execution process before adding a transaction into the transaction pool, which may reduce the consensus duration consumed by the consensus process, and meanwhile, improve the utilization rate of the system resources by using the characteristics of concurrently receiving and concurrently executing transactions of the consensus node, thereby improving the throughput of the blockchain.

In some embodiments, the operation of performing conflict detection on the proposal block based on a conflict detection policy to obtain a second consensus result of the proposal block includes: taking a transaction in the transaction list as a transaction to be verified, and taking a local transaction execution record corresponding to the transaction to be verified acquired from a second transaction execution data set as local transaction data associated with the transaction to be verified, the second transaction execution data set being used for recording a local transaction record corresponding to each transaction received by the second consensus node, and a local transaction execution record corresponding to the transaction to be verified being obtained by the second consensus node by executing the transaction to be verified; performing local verification on the to-be-processed transaction data in the proposal block based on the local transaction data to obtain a local verification result; and determining the second consensus result corresponding to the proposal block based on the local verification result.

Specifically, the second consensus node may perform a local check on the initial transaction execution record (that is, the to-be-processed transaction data) corresponding to each transaction in the proposal block. Since the transaction in the proposal block is broadcast to the second consensus node before being executed by the first consensus node, the transaction exists locally in the second consensus node with a large probability, and may have been executed in advance. Therefore, the second consensus node may compare the data after the relevant transactions are executed, for example, comparing the transaction execution result, the transaction read-write set in response to executing the transaction, and the latest block height of an account book in response to executing the transaction. A specific process may be: the second consensus node may take the transaction in the transaction list as the transaction to be verified and take the local transaction execution record corresponding to the transaction to be verified acquired from the second transaction execution data set as the local transaction data associated with the transaction to be verified. The second transaction execution data set is associated with a second transaction pool of the second consensus node, and it is to be understood that the second transaction pool may also store transactions to be packed (including transactions to be verified). The second transaction execution data set is used for recording a local transaction record corresponding to each transaction received by the second consensus node. The local transaction execution record corresponding to the transaction to be verified is obtained by the second consensus node by executing the transaction to be verified. It is to be understood that, due to the influence of a network transmission delay, the data stored by some consensus nodes may lag that stored in other consensus nodes, which may result in inconsistent transaction execution records obtained by different nodes executing the same transaction.

In some embodiments, the second consensus node may perform local verification on the to-be-processed transaction data in the proposal block based on the local transaction data to obtain a local check result, and then may determine a second consensus result corresponding to the proposal block based on the local check result.

For example, assuming that the transaction list in a certain proposal block includes a transaction 1, a transaction 2, and a transaction 3, the transaction 1, the transaction 2, and the transaction 3 may all be collectively referred to as transactions to be verified. Meanwhile, the initial transaction execution record corresponding to the transaction 1 is a transaction execution record A1, the initial transaction execution record corresponding to the transaction 2 is a transaction execution record A2, and the initial transaction execution record corresponding to the transaction 3 is a transaction execution record A3; the transaction execution record A1, the transaction execution record A2, and the transaction execution record A3 may all be collectively referred to as to-be-processed transaction data; and these initial transaction execution records are obtained after the first consensus node executes the transaction 1, the transaction 2, and the transaction 3 respectively. Similarly, the second consensus node obtains the local transaction execution record corresponding to the transaction 1 as a transaction execution record B1 after executing the transaction 1, obtains a local transaction execution record corresponding to the transaction 2 as a transaction execution record B2 after executing the transaction 2, and obtains a local transaction execution record corresponding to the transaction 3 as a transaction execution record B3 after executing the transaction 3; and the transaction execution record B1, the transaction execution record B2, and the transaction execution record B3 may all be collectively referred to as local transaction data. Therefore, the second consensus node may perform local verification on the transaction execution record A1 based on the transaction execution record B1 to obtain a local verification result C1, perform local verification on the transaction execution record A2 based on the transaction execution record B2 to obtain a local verification result C2, and perform local verification on the transaction execution record A3 based on the transaction execution record B3 to obtain a local verification result C3; and finally, a second consensus result corresponding to the proposal block may be determined based on the local verification result C1, the local verification result C2, and the local verification result C3.

In the above embodiment, local verification is performed on the to-be-processed transaction data in the proposal block based on the local transaction data to obtain a local verification result, and a second consensus result corresponding to the proposal block is determined based on the local verification result, so as to improve the accuracy of the second consensus result.

In some embodiments, the to-be-processed transaction data includes a target transaction execution result corresponding to the transaction to be verified, a target transaction read-write set, and a first block height. The first block height is a block height of a first block, and the first block is a block that is acquired from the blockchain network by the first consensus node in response to executing the transaction to be verified and that has a first maximum generation timestamp. The local transaction data includes a local transaction execution result corresponding to the transaction to be verified, a local transaction read-write set, and a second block height. The second block height is a block height of a second block, and the second block is a block that is acquired from the blockchain network by the second consensus node in response to executing the transaction to be verified and that has a second maximum generation timestamp. The operation of performing local verification on the to-be-processed transaction data in the proposal block based on the local transaction data to obtain a local verification result includes: comparing a target transaction execution result with a local transaction execution result to obtain a first comparison result; comparing the first block height with the second block height to obtain a second comparison result in a case that the first comparison result indicates that the target transaction execution result is the same as the local transaction execution result; and determining a local verification result corresponding to the proposal block based on the second comparison result.

The to-be-processed transaction data may include the target transaction execution result corresponding to the transaction to be verified, the target transaction read-write set, and the first block height. The first block height is the block height of the first block that is acquired from the blockchain network by the first consensus node in response to executing the transaction to be verified and that has a first maximum generation timestamp. It may be understood that the transaction to be verified includes an initial transaction, so the target transaction execution result includes an initial transaction execution result corresponding to the initial transaction, the target transaction read-write set includes an initial transaction read-write set corresponding to the initial transaction, and the first block height includes an initial block height. Similarly, the local transaction data may include a local transaction execution result corresponding to a transaction to be verified, a local transaction read-write set, and a second block height. The second block height is the block height of the second block that is acquired from the blockchain network by the second consensus node in response to executing the transaction to be verified and that has a second maximum generation timestamp.

Specifically, the second consensus node may compare the target transaction execution result with the local transaction execution result to obtain a first comparison result. The first block height may further be compared with the second block height to obtain a second comparison result in a case that the first comparison result indicates that the target transaction execution result is the same as the local transaction execution result, and then the local verification result corresponding to the proposal block may be determined based on the second comparison result.

In the above embodiment, the local verification result is determined based on the comparison result of the first block height and the second block height in a case that the target transaction execution result is the same as the local transaction execution result, thereby improving the accuracy of the local verification result.

In some embodiments, the first maximum generation timestamp is the same as the second maximum generation timestamp. The operation of determining the local verification result corresponding to the proposal block based on the second comparison result includes: comparing, in a case that the second comparison result indicates that the first block height is the same as the second block height, the target transaction read-write set with the local transaction read-write set to obtain a third comparison result; and determining the local verification result corresponding to the proposal block based on the third comparison result.

Specifically, the second comparison result will indicate that the first block height is the same as the second block height in a case that the first maximum generation timestamp is the same as the second maximum generation timestamp, then the second consensus node may further compare the target transaction read-write set with the local transaction read-write set to obtain a third comparison result, and finally, the local verification result corresponding to the proposal block may be obtained based on the third comparison result.

In the above embodiment, the local verification result is determined based on the target transaction read-write set and the local transaction read-write set in a case that the first block height is the same as the second block height, which improves the accuracy of the local verification result.

In some embodiments, the first maximum generation timestamp is different from the second maximum generation timestamp; the target transaction read-write set includes a first account state version number. The first account state version number is an account state version number that is associated with the transaction to be verified and that has the first maximum update timestamp, and the first account state version number is acquired by the first consensus node from the blockchain network in response to executing the transaction to be verified. The local transaction read-write set includes a second account state version number. The second account state version number is an account state version number that is associated with the transaction to be verified and that has the second maximum update timestamp, and the second account state version number is acquired by the second consensus node from the blockchain network in response to executing the transaction to be verified. The operation of determining the local verification result corresponding to the proposal block based on the second comparison result includes: comparing, in a case that the second comparison result indicates that the first block height is different from the second block height, the first account state version number with the second account state version number to obtain a fourth comparison result; acquiring, in a case that the fourth comparison result indicates that the first account state version number is different from the second account state version number, a third account state version number that is associated with the transaction to be verified and that has a third maximum update timestamp, and comparing the first account state version number with the third account state version number to obtain a fifth comparison result; re-executing, in a case that the fifth comparison result indicates that the third account state version number is lower than the first account state version number, the transaction to be verified to obtain an updated transaction execution result, and comparing the target transaction execution result with the updated transaction execution result to obtain a sixth comparison result; and determining a local verification result corresponding to the proposal block based on the sixth comparison result.

Specifically, the second comparison result will indicate that the first block height is different from the second block height in a case that the first maximum generation timestamp is different from the second maximum generation timestamp, then the second consensus node may further compare the first account state version number with the second account state version number to obtain fourth comparison result. Further, a third account state version number that is associated with the transaction to be verified and that has a third maximum update timestamp may be acquired from the blockchain network in a case that the fourth comparison result indicates that the first account state version number is different from the second account state version number, and then first account state version number may be compared with the third account state version number to obtain a fifth comparison result. The transaction to be verified may be re-executed to obtain an updated transaction execution result in a case that the fifth comparison result indicates that the third account state version number is lower than the first account state version number, and then the target transaction execution result may be compared with the updated transaction execution result to obtain a sixth comparison result, and finally, the local verification result corresponding to the proposal block may be determined based on the sixth comparison result.

The target transaction read-write set includes a first account state version number. The first account state version number refers to an account state version number that is associated with the transaction to be verified and that has the first maximum update timestamp acquired by the first consensus node from the blockchain network (for example, a local cache of the first consensus node) in response to executing the transaction to be verified. Similarly, the local transaction read-write set includes a second account state version number. The second account state version number refers to an account state version number that is associated with the transaction to be verified and that has the second maximum update timestamp acquired by the second consensus node from the blockchain network (for example, a local cache of the second consensus node) in response to executing the transaction to be verified.

The second consensus node may vote against the proposal block in a case that the local verification result indicates a local verification failure. The second consensus node may vote against the proposal block in a case that the transaction execution results do not match, that is, the first comparison result indicates that the target transaction execution result is different from the local transaction execution result. The second consensus node may vote against the proposal block in a case that the latest heights of an account book in response to executing the transaction are consistent but the transaction read-write sets after the execution of transaction are inconsistent, that is, the second comparison result indicates that the first block height is the same as the second block height, but the third comparison result indicates that the target transaction read-write set is different from the local transaction read-write set. Whether the account state version numbers are consistent may be compared in a case that the latest heights of the account book in response to executing the transaction are inconsistent. It is compared whether the latest account state version number (that is, the third account state version number) associated with the current second consensus node in the local cache is consistent with the account state version number (that is, the first account state version number) in the proposal block in a case that the account state version numbers are inconsistent. In a case that the relevant account state version number in the local cache is lower than the account state version number in the proposal block, it indicates that the second consensus node lags behind the first consensus node, then the second consensus node may re-execute the transaction based on the latest data read from the local cache thereof, and compare a transaction execution result after the local re-execution with the transaction execution result in the proposal block. The second consensus node may vote against the proposal block in a case that the transaction execution result after the local re-execution and the transaction execution result in the proposal block are inconsistent (that is, the sixth comparison result indicates that the target transaction execution result is different from an update transaction execution result). It is to be understood that data tampering, reasons such as running code errors, data with the data, error in running the code, and data lagging may result in that the target transaction execution is different from the update transaction execution result.

In the above embodiment, the local verification result corresponding to the proposal block is determined by comprehensively considering the block height, the account state version number, and the transaction execution result, which improves the accuracy of the local verification result.

In some embodiments, the operation of performing conflict detection on the proposal block based on a conflict detection policy to obtain a second consensus result of the proposal block includes: performing association verification on the transaction list to obtain an association verification result; acquiring at least two associated transactions having an association relationship from the transaction list based on the association verification result, and acquiring transaction read-write sets respectively corresponding to the at least two associated transactions from the to-be-processed transaction data; performing read-write set conflict detection on each transaction read-write set based on transaction execution orders respectively corresponding to the at least two associated transactions to obtain a read-write set conflict detection result; and determining the second consensus result corresponding to the proposal block based on the read-write set conflict detection result.

Specifically, the second consensus node may perform association verification and read-write set conflict detection on the transaction list in the proposal block, that is, perform association verification and read-write set conflict detection on the transaction list in the proposal block in order. A specific process may be: the second consensus node may perform association verification on the transaction list to obtain an association verification result, then may acquire at least two associated transactions having an association relationship from the transaction list based on the association verification result, and acquire transaction read-write sets respectively corresponding to the at least two associated transactions from the to-be-processed transaction data. Further, read-write set conflict detection may be performed on each transaction read-write set to obtain a read-write set conflict detection result based on transaction execution orders respectively corresponding to the at least two associated transactions, and finally the second consensus result corresponding to the proposal block may be determined based on the read-write set conflict detection result. The second consensus node may vote against the proposal block in a case that the read-write set conflict detection result indicates a detection failure. For example, in a transaction list X, there is an association relationship between the transaction 1 and the transaction 3. For example, the transaction 1 is that a user A transfers a first asset to be transferred (for example, 100 yuan) from the remaining assets (for example, 200 yuan) thereof to a user B, and the transaction 3 is that the user A transfers a second asset to be transferred (for example, 70 yuan) from the remaining assets thereof to the user B, then the transaction 1 and the transaction 3 may be taken as associated transactions. If the transaction timestamp of the transaction 1 is less than the transaction timestamp of the transaction 3, then a write data set of the transaction 1 and a read data set of the transaction 3 may be acquired. The write data set of the transaction 1 is compared with the read data set of the transaction 3 to obtain a read-write set conflict detection result. In a case that key data therein is inconsistent, for example, the remaining assets of the user A recorded in the write data set of the transaction 1 after executing the transaction 1 are 100 yuan, while the remaining assets of the user A read in response to executing the transaction 3 recorded in the read data set of the transaction 3 are still 200 yuan before executing the transaction 1, then the relevant read-write data sets conflict, and the read-write set conflict detection result indicates a verification failure.

In some embodiments, the second consensus node may jointly determine the second consensus result corresponding to the proposal block based on the block signature verification result, a tree root comparison result, a hash value comparison result, a node verification result, a target validity verification result, a local verification result, and a read-write set conflict detection result, that is, the second consensus node will vote for the proposal block only after all verifications pass. The conflict detection in an embodiment of the disclosure may also include other detection content.

In the above embodiment, read-write set conflict detection is performed on each transaction read-write set to obtain a read-write set conflict detection result, and the second consensus result corresponding to the proposal block is determined based on the read-write set conflict detection result, so that the accuracy of the second consensus result is improved by using the conflict detection.

Figure 6:
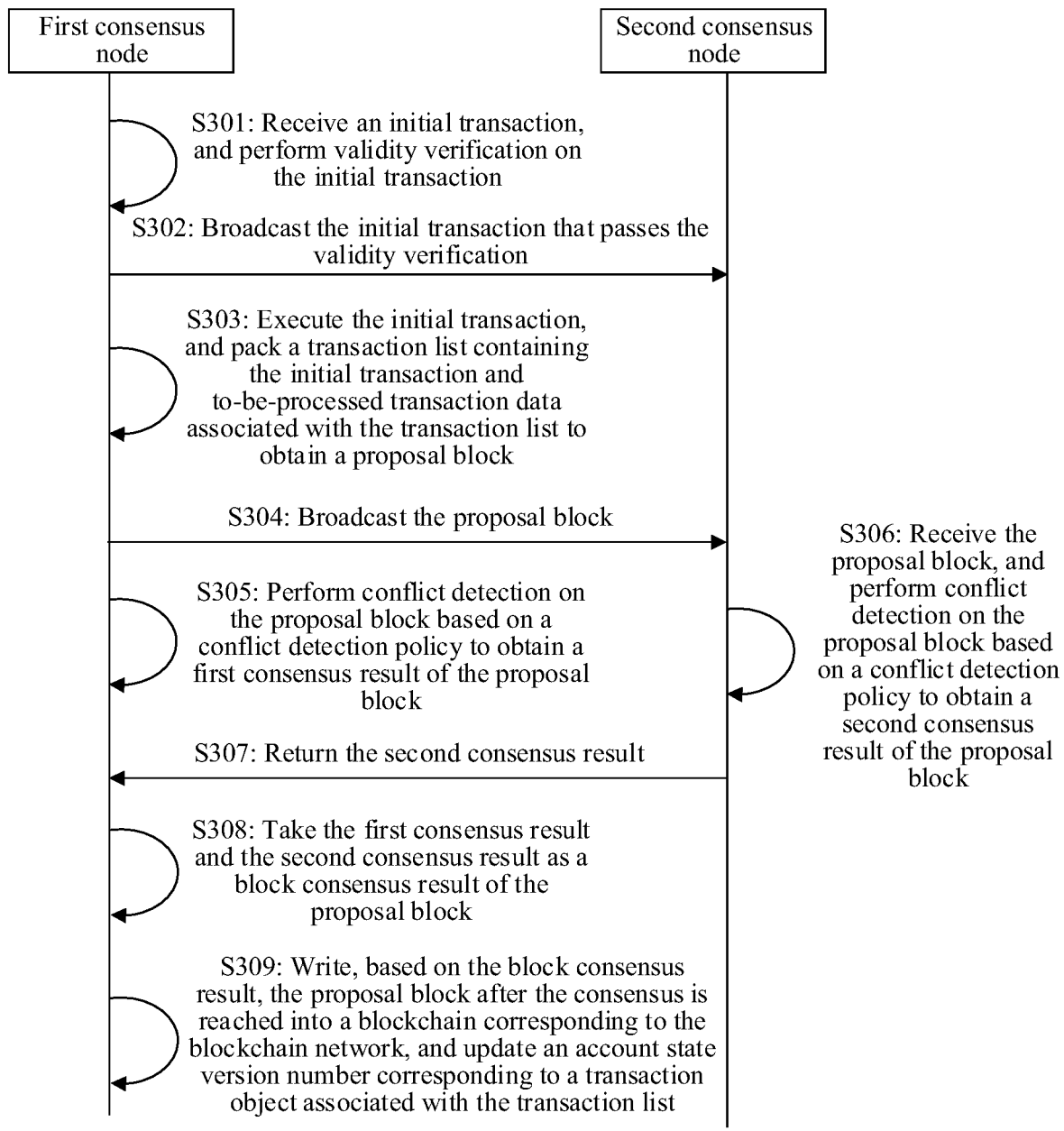
FIG. 6 is a schematic flowchart of a transaction data processing method provided by the embodiments of the disclosure.

FIG. 6 is a schematic flowchart of a transaction data processing method provided by the embodiments of the disclosure. As shown in FIG. 6, the method may be jointly performed by a first consensus node and a second consensus node in a blockchain network. The first consensus node and the second consensus node may be servers that access the blockchain network or may be terminal devices that access the blockchain network. The first consensus node may be any one of the consensus nodes, for example, the node 10*a*, in the blockchain node system as shown in FIG. 1. The second consensus node may be a consensus node to be broadcast, for example, the node 10*b*, in the blockchain node system as shown in FIG. 1. The method may include at least the following steps:

S301: The first consensus node receives an initial transaction, and performs validity verification on the initial transaction to obtain a validity verification result.

S302: Determine, in a case that the validity verification result indicates that the transaction is valid, that the initial transaction passes the validity verification, and the first consensus node broadcasts the initial transaction that passes the validity verification to the second consensus node. It is to be understood that the first consensus node also performs similar processing on other received transactions.

Step S303: The first consensus node executes the initial transaction to obtain an initial transaction execution record corresponding to the initial transaction, and then may add the initial transaction execution record corresponding to the initial transaction to a first transaction execution data set associated with a first transaction pool of the first consensus node and add the initial transaction to the first transaction pool. Further, a transaction list containing the initial transaction and to-be-processed transaction data associated with the transaction list may be packed to obtain a proposal block that is to be subjected to block consensus with a second consensus node in the blockchain network.

Step S304: The first consensus node broadcasts the proposal block to the second consensus node.

Step S305: The first consensus node performs conflict detection on the proposal block based on the conflict detection policy to obtain a first consensus result.

Step S306: The second consensus node receives the proposal block broadcast by the first consensus node, and performs conflict detection on the proposal block based on the conflict detection policy to obtain a second consensus result.

Step S307: The second consensus node returns the second consensus result to the first consensus node. That is, the second consensus node may broadcast a voting result.

Step S308: The first consensus node receives the second consensus result returned by the second consensus node, and takes the first consensus result and the second consensus result as a block consensus result of the proposal block.

Specifically, the first consensus node may take the first consensus result and the second consensus result as the block consensus result of the proposal block. The block consensus result may be obtained on the basis of a number of affirmative votes or negative notes, for example, in a case that the number of affirmative votes is greater than a first voting threshold (for example, the proportion of the number of affirmative votes exceeds ⅔ of a total number of votes), the block consensus result indicates a consensus success, that is, it may be determined that the consensus on the proposal block is reached. On the contrary, in a case that the number of negative votes is greater than a second voting threshold (for example, the proportion of the number of negative votes exceeds ⅔ of the total number of votes), the block consensus result indicates that a consensus failure, that is, it may be determined that the consensus on the proposal block cannot be reached. The first voting threshold and the second voting threshold may be set as required.

Step S309: The first consensus node writes, based on the block consensus result, the proposal block after the consensus is reached into a blockchain corresponding to the blockchain network, and updates an account state version number corresponding to a transaction object associated with the transaction list.

Figure 7:
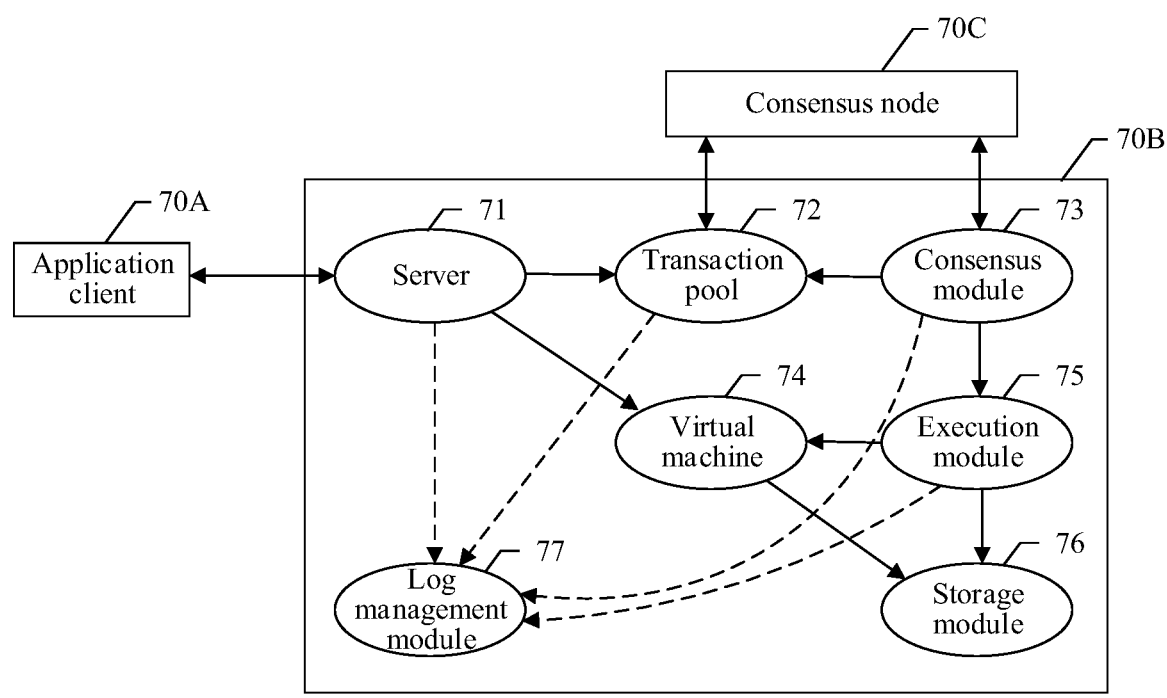
FIG. 7 is an interaction diagram of a blockchain transaction process provided by the embodiments of the disclosure.

FIG. 7 is an interaction diagram of a blockchain transaction process provided by the embodiments of the disclosure. As shown in FIG. 7, an application client 70A runs on a certain terminal device. There is a data connection between the application client 70A and a server 71 running in a consensus node 70B. The application client 70A may communicate with the server 71 by using a WebSocket protocol. The WebSocket is a protocol for full-duplex communication on a single transmission control protocol (TCP). The WebSocket makes data exchange between the application client and the server simpler, and allows a server end to actively push data to a client. The consensus node 70B may be any consensus node in the blockchain network, for example, may be the node 10a shown in FIG. 1. A consensus node 70C and the consensus node 70B are located in the same blockchain network and may perform data interaction with each other, for example, broadcasting data such as blocks or transactions with each other. The internal structures of all consensus nodes are the same. An embodiment of the disclosure is described by only taking the consensus node 70B as an example. Validity verification, including transaction signature verification and double spending verification, may be performed on the transaction after the consensus node 70B receives the transaction transmitted from the application client 70A through the server 71. The consensus node 70B may invoke a virtual machine 74 in an execution module 75 to execute the transaction in a case that the transaction passes through the validity verification. At this time, the virtual machine 74 may read corresponding data (that is, a read data set) from a storage module 76 (that is, a storage layer) to execute the transaction to obtain a corresponding transaction execution record, and then may add the transaction execution record to the storage module 76 and add the transaction to a transaction pool 72. Further, the consensus module 73 may periodically acquire a batch of transaction lists to be packed from the transaction pool 72 according to a consensus rhythm, acquire the to-be-processed transaction data associated with the transaction list from the storage module 76, then may pack the transaction list and the to-be-processed transaction data together into the proposal block, and broadcast the proposal block to other consensus nodes (for example, the consensus node 70C) for performing consensus. In a consensus process, the consensus node will perform the conflict detection and the voting on the proposal block to obtain a block consensus result. The consensus node may write the proposal block and the relevant transaction execution result into the storage module 76 after the consensus is reached on the proposal block, and then starts a new round of packing and consensus. A log manager 77 may perform corresponding event monitoring on the server 71, the transaction pool 72, the recognition module 73, and the execution module 75.

Figure 8:
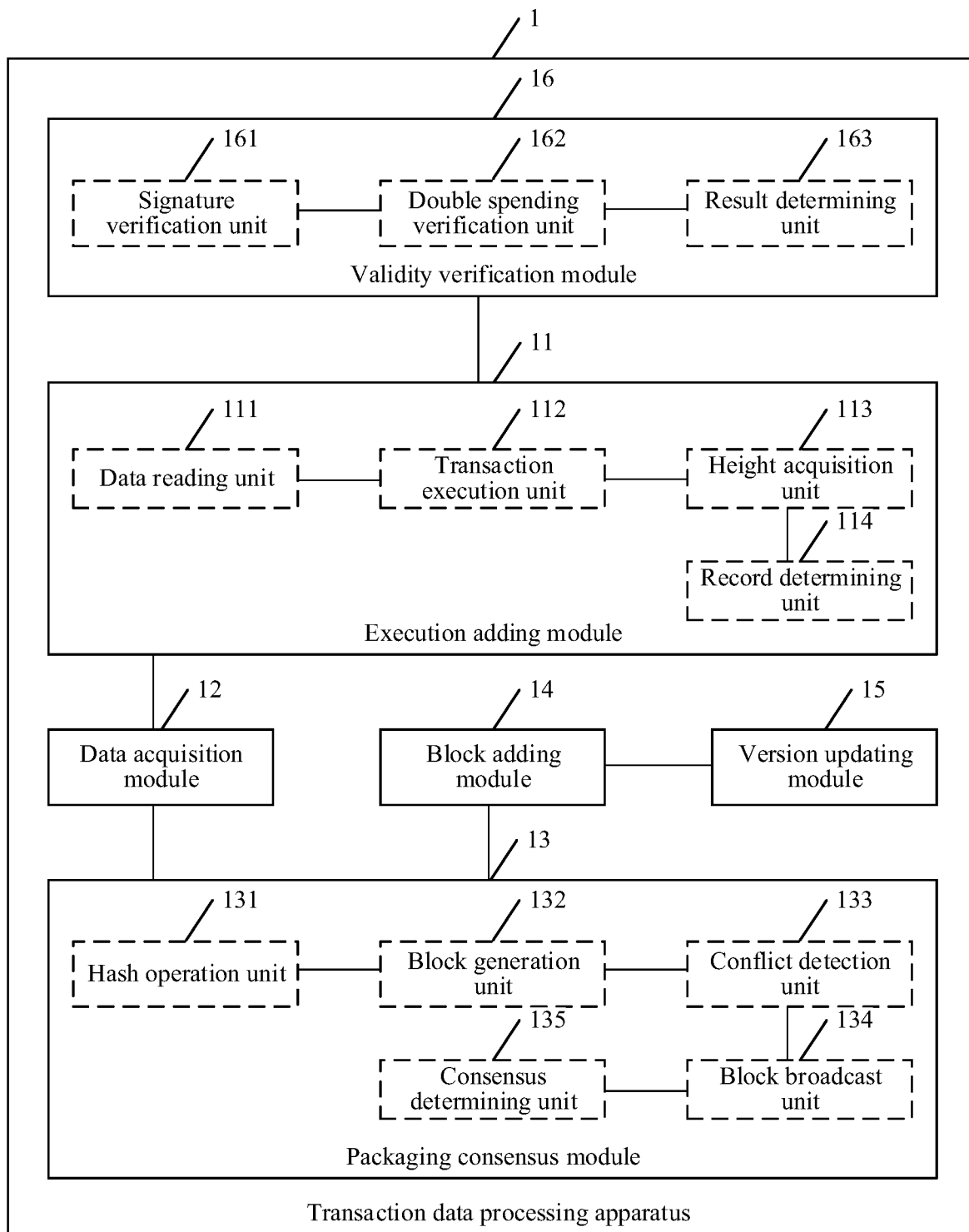
FIG. 8 is a schematic structural diagram of a transaction data processing apparatus provided by the embodiments of the disclosure.

FIG. 8 is a schematic structural diagram of a transaction data processing apparatus provided by the embodiments of the disclosure. The transaction data processing apparatus may be non-transitory computer-readable instructions (including program code) running on a computer device. For example, the transaction data processing apparatus is application software. The apparatus may be configured to perform corresponding steps in a transaction data processing method provided by the embodiments of the disclosure. As shown in FIG. 8, a transaction data processing apparatus 1 may run in a first consensus node in a blockchain network. The first consensus node may be a consensus node 20A in an embodiment corresponding to FIG. 2 above. The transaction data processing apparatus 1 may include: an execution adding module 11, a data acquisition module 12, and a packing consensus module 13.

The execution adding module 11 is configured to execute, in response to receiving an initial transaction, the initial transaction to obtain an initial transaction execution record corresponding to the initial transaction, add the initial transaction execution record corresponding to the initial transaction to a first transaction execution data set, and add the initial transaction to a first transaction pool. The first transaction execution data set is used for recording the initial transaction execution record corresponding to each transaction received by the first consensus node.

The data acquisition module 12 is configured to acquire a transaction list containing the initial transaction from the first transaction pool, and take the initial transaction execution record corresponding to each transaction in the transaction list as to-be-processed transaction data associated with the transaction list. The initial transaction corresponding to each transaction in the transaction list is acquired from the first transaction execution data set.

The packing consensus module 13 is configured to pack the transaction list and the to-be-processed transaction data to obtain a proposal block that is to be subjected to block consensus with a second consensus node in the blockchain network, and perform block consensus on the proposal block to obtain a block consensus result of the proposal block.

In some embodiments, as shown in FIG. 8, the execution adding module 11 may include: a data reading unit 111, a transaction execution unit 112, a height acquisition unit 113, and a record determining unit 114.

The data reading unit 111 is configured to acquire, in response to receiving the initial transaction, an initial service contract for executing the initial transaction, and reading an initial read data set corresponding to the initial transaction from the blockchain network based on the initial service contract.

The transaction execution unit 112 is configured to invoke, based on the initial read data set, a virtual machine to execute the initial transaction to obtain an initial transaction execution result corresponding to the initial transaction, write the initial transaction execution result into an initial write data set corresponding to the initial transaction, and take the initial read data set and the initial write data set as an initial transaction read-write set corresponding to the initial transaction.

The height acquisition unit 113 is configured to take a block that is acquired in response to executing the initial transaction and that has an initial maximum generation timestamp as a first target block, and take a block height of the first target block as an initial block height.

The record determining unit 114 is configured to take the initial transaction execution result, the initial transaction read-write set, and the initial block height as the initial transaction execution record corresponding to the initial transaction.

In some embodiments, the packing consensus module 13 may include: a hash operation unit 131 and a block generation unit 132.

The hash operation unit 131 is configured to take a transaction in a transaction list as a transaction to be verified, and perform a hash operation on the transaction to be verified and to-be-processed transaction data to obtain a Merkle tree root corresponding to the transaction to be verified.

The block generation unit 132 is configured to acquire a block having a target maximum generation timestamp from the blockchain network to obtain a second target block, and generate a proposal block that is to be subjected to block consensus with a second consensus node in the blockchain network based on the transaction to be verified, the to-be-processed transaction data, the Merkle tree root, and a block hash value of the second target block.

In some embodiments, the packing consensus module 13 may include: a conflict detection unit 133, a block broadcast unit 134, and a consensus determining unit 135.

The conflict detection unit 133 is configured to perform conflict detection on the proposal block based on a conflict detection policy to obtain a first consensus result.

The block broadcast unit 134 is configured to broadcast the proposal block to the second consensus node, so that the second consensus node performs conflict detection on the proposal block based on the conflict detection policy to obtain a second consensus result.

The consensus determining unit 135 is configured to receive the second consensus result returned by the second consensus node, and take the first consensus result and the second consensus result as a block consensus result of the proposal block.

In some embodiments, as shown in FIG. 8, the transaction data processing apparatus 1 may further include: a block adding module 14 and a version updating module 15.

The block adding module 14 is configured to determine, in a case that the block consensus result indicates a consensus success, that a consensus on the proposal block is reached, and write the proposal block after reaching the consensus as a third target block into a blockchain corresponding to the blockchain network.

The version updating module 15 is configured to update an account state version number corresponding to a transaction object associated with a transaction list.

In some embodiments, the transaction data processing apparatus 1 may further include: a validity verification module 16.

The validity check module 16 is configured to perform validity verification on the initial transaction to obtain a validity verification result, determine, in a case that the validity verification result indicates that the transaction is valid, that the initial transaction passes the validity verification, and broadcast the initial transaction after passing the validity verification to the second consensus node, so that the second consensus node executes the initial transaction after passing the validity verification.

In some embodiments, the validity verification module 16 may include: a signature verification unit 161, a double spending verification unit 162, and a result determining unit 163.

The signature verification unit 161 is configured to acquire transaction signature information of an initial transaction and a device public key of a terminal device that transmits the initial transaction, and perform transaction signature verification on the transaction signature information based on the device public key to obtain a transaction signature verification result. The transaction signature information is obtained after the terminal device signs the initial transaction through a device private key corresponding to the device public key.

The double spending verification unit 162 is configured to perform double spending verification on the initial transaction to obtain a double spending verification result.

The result determining unit 163 is configured to take the transaction verification result and the double spending verification result as a validity verification result corresponding to the initial transaction.

In some embodiments, the transaction data processing apparatus 1 is further configured to:

determine that the validity verification result indicates that the transaction is valid in a case that the transaction signature verification result indicates a signature verification success and the double spending verification result indicates that there is no double spending attack.

Figure 9:
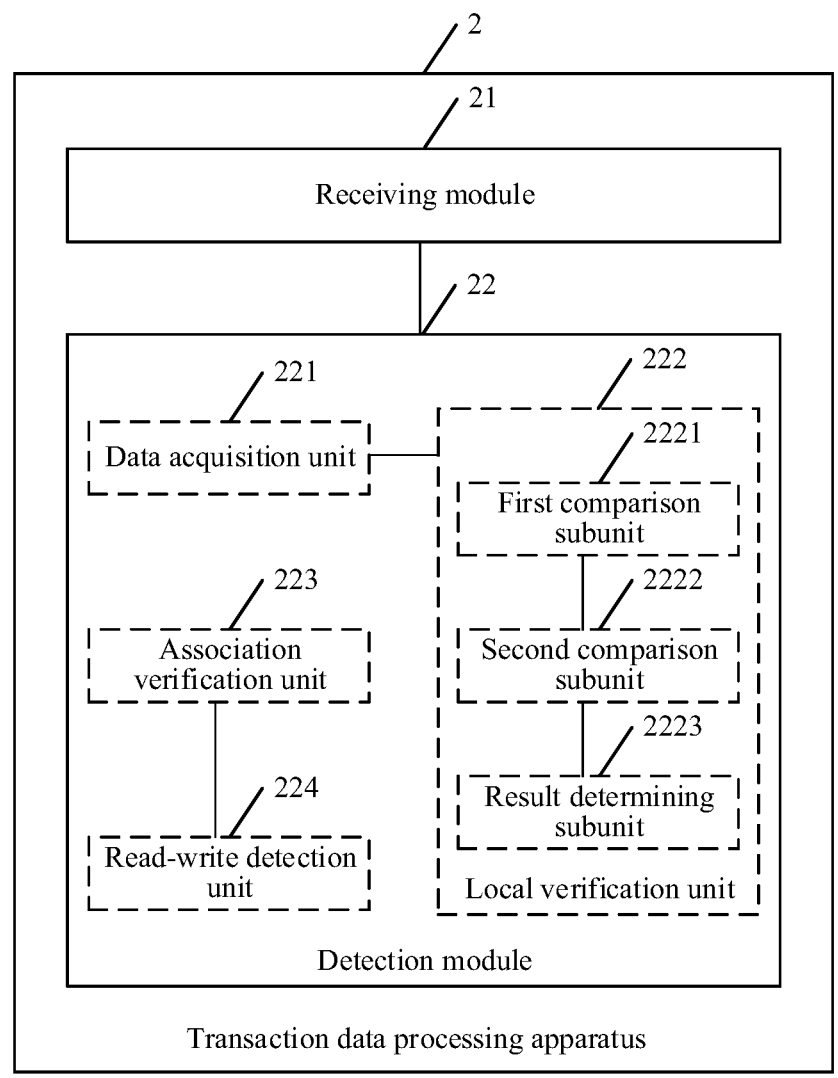
FIG. 9 is a schematic structural diagram of a transaction data processing apparatus provided by the embodiments of the disclosure.

FIG. 9 is a schematic structural diagram of a transaction data processing apparatus provided by the embodiments of the disclosure. The transaction data processing apparatus may be non-transitory computer-readable instructions (including program code) running on a computer device. For example, the transaction data processing apparatus is application software. The apparatus may be configured to perform corresponding steps in a transaction data processing method provided by the embodiments of the disclosure. As shown in FIG. 9, a transaction data processing apparatus 2 may run in a second consensus node in a blockchain network. The second first consensus node may be a consensus node 20B in an embodiment corresponding to FIG. 2 above. The transaction data processing apparatus 2 may include: a receiving module 21 and a detection module 22.

The receiving module 21 is configured to receive a proposal block broadcast by a first consensus node in a blockchain network. The proposal block being obtained by the first consensus node by packing a transaction list and to-be-processed transaction data associated with the transaction list; the transaction list is acquired by the first consensus node from a first transaction pool of the first consensus node, and the transaction list contains an initial transaction. The to-be-processed transaction data includes an initial transaction execution record corresponding to each transaction in the transaction list in a first transaction execution data set. The first transaction execution data set is used for recording the initial transaction execution record corresponding to each transaction received by the first consensus node. The initial transaction execution record corresponding to the initial transaction is added to the first transaction execution data set by the first consensus node, and the initial transaction execution record corresponding to the initial transaction is obtained by the first consensus node by executing the initial transaction in response to receiving the initial transaction.

The detection module 22 is configured to perform conflict detection on the proposal block based on a conflict detection policy to obtain a second consensus result of the proposal block, and return the second consensus result to the first consensus node.

In some embodiments, as shown in FIG. 9, the detection module 22 may include: a data acquisition unit 221 and a local verification unit 222.

The data acquisition unit 221 is configured to take a transaction in a transaction list as a transaction to be verified, and take a local transaction execution record corresponding to the transaction to be verified acquired from a second transaction execution data set as local transaction data associated with the transaction to be verified. The second transaction execution data set is used for recording a local transaction record corresponding to each transaction received by a second consensus node. The local transaction execution record corresponding to the transaction to be verified is obtained by the second consensus node by executing the transaction to be verified.

A local verification unit 222 is configured to: perform local verification on the to-be-processed transaction data in the proposal block based on the local transaction data to obtain a local verification result; and determine a second consensus result corresponding to the proposal block based on the local verification result. In some embodiments, the to-be-processed transaction data includes a target transaction execution result corresponding to the transaction to be verified, a target transaction read-write set, and a first block height. The first block height is a block height of a first block, and the first block is a block that is acquired from the blockchain network by the first consensus node in response to executing the transaction to be verified and that has a first maximum generation timestamp. The local transaction data includes a local transaction execution result corresponding to the transaction to be verified, a local transaction read-write set, and a second block height. The second block height is a block height of a second block, and the second block is a block that is acquired from the blockchain network by the second consensus node in response to executing the transaction to be verified and that has a second maximum generation timestamp.

The local verification unit 222 may include: a first comparison subunit 2221, a second comparison subunit 2222, and a result determining subunit 2223.

The first comparison subunit 2221 is configured to compare the target transaction execution result with the local transaction execution result to obtain a first comparison result.

The second comparison subunit 2222 is configured to compare the first block height with the second block height to obtain a second comparison result in a case that the first comparison result indicates that the target transaction execution result is the same as the local transaction execution result.

The result determining subunit 2223 is configured to determine a local verification result corresponding to the proposal block based on the second comparison result.

In some embodiments, the first maximum generation timestamp is the same as the second maximum generation timestamp.

The result determining subunit 2223 is further configured to: compare a target transaction read-write set with a local transaction read-write set to obtain a third comparison result in a case that the second comparison result indicates that the first block height is the same as the second block height; and determine the local verification result corresponding to the proposal block based on the third comparison result.

In some embodiments, the first maximum generation timestamp is different from the second maximum generation timestamp. The target transaction read-write set includes a first account state version number. The first account state version number is an account state version number that is associated with the transaction to be verified and that has the first maximum update timestamp, and the first account state version number is acquired by the first consensus node from the blockchain network in response to executing the transaction to be verified. The local transaction read-write set includes a second account state version number. The second account state version number is an account state version number that is associated with the transaction to be verified and that has the second maximum update timestamp, and the second account state version number is acquired by the second consensus node from the blockchain network in response to executing the transaction to be verified.

The result determining subunit 2223 is further configured to: compare, in a case that the second comparison result indicates that the first block height is different from the second block height, the first account state version number with the second account state version number to obtain a fourth comparison result; acquire, in a case that the fourth comparison result indicates that the first account state version number is different from the second account state version number, a third account state version number that is associated with the transaction to be verified and that has a third maximum update timestamp, and comparing the first account state version number with the third account state version number to obtain a fifth comparison result; re-execute, in a case that the fifth comparison result indicates that the third account state version number is lower than the first account state version number, the transaction to be verified to obtain an updated transaction execution result, and compare the target transaction execution result with the updated transaction execution result to obtain a sixth comparison result; and determine a local verification result corresponding to the proposal block based on the sixth comparison result.

In some embodiments, the detection module 22 may include: an association verification unit 223 and a read-write detection unit 224.

The association verification unit 223 is configured to: perform association verification on a transaction list to obtain an association verification result; and acquire at least two associated transactions having an association relationship from the transaction list based on an association verification result, and acquire transaction read-write sets respectively corresponding to the at least two associated transactions from to-be-processed transaction data.

The read-write detection unit 224 is configured to: perform read-write set conflict detection on each transaction read-write set based on transaction execution orders respectively corresponding to the at least two associated transactions to obtain a read-write set conflict detection result; and determine the second consensus result corresponding to the proposal block based on the read-write set conflict detection result.

Figure 10:
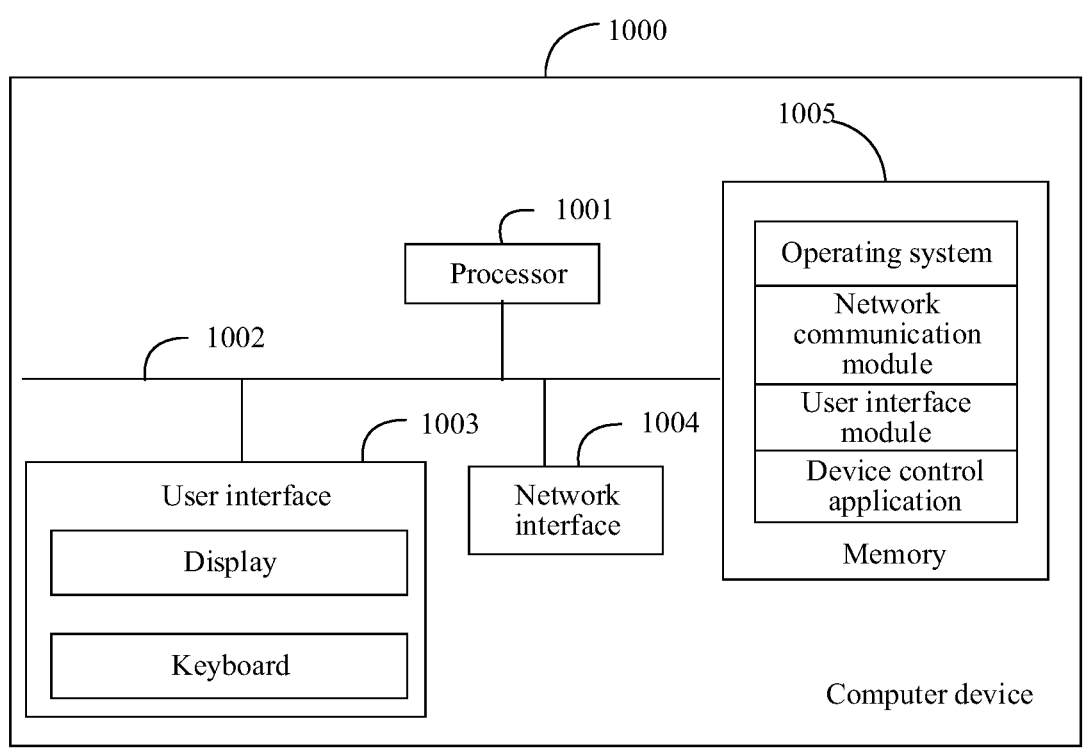
FIG. 10 is a schematic structural diagram of a computer device provided by the embodiments of the disclosure.

Reference is made to FIG. 10, which is a schematic structural diagram of a computer device provided by the embodiments of the disclosure. As shown in FIG. 10, the computer device 1000 may include: a processor 1001, a network interface 1004, and a memory 1005. In addition, the above computer device 1000 may further include: a user interface 1003, and at least one communication bus 1002. The communication bus 1002 is configured to implement connection communication between these components. The user interface 1003 may include a display and a keyboard, and optionally, the user interface 1003 may further include a standard wired interface and a standard wireless interface. Optionally, the communication interface 1004 may include a standard wired interface and a standard wireless interface (for example, a WI-FI interface). The memory 1004 may be a high-speed random access memory (RAM), or may be a non-volatile memory, for example, at least one magnetic disk memory. Optionally, the memory 1005 may alternatively be at least one storage apparatus located remotely from the aforementioned processor 1001. As shown in FIG. 10, the memory 1005, as a computer-readable storage medium, may include an operating system, a network communication module, a user interface module, and a device control application.

In the computer device 1000 as shown in FIG. 10, the network interface 1004 may provide a network communication function. The user interface 1003 is mainly configured to provide an interface for a user to input. The processor 1001 may be configured to invoke a device control application stored in the memory 1005 to perform the description of the transaction data processing method in an embodiment corresponding to any of FIG. 3, FIG. 5, and FIG. 6. In addition, the advantageous effects of using the same method are described.

Furthermore, it is to be pointed that: the embodiments of the disclosure also provide a non-transitory computer-readable storage medium. The non-transitory computer-readable storage medium stores non-transitory computer-readable instructions executed by the transaction data processing apparatus 1 or the transaction data processing apparatus 2 mentioned above. When a processor executes the instructions, the description of the transaction data processing method in an embodiment corresponding to any of FIG. 3, FIG. 5, and FIG. 6 may be performed. In addition, the advantageous effects of using the same method are described. For technical details undisclosed in the embodiments of the non-transitory computer-readable storage medium involved in the disclosure, reference is made to the description of the embodiments of the method of the disclosure.

The above non-transitory computer-readable storage medium may be the transaction data processing apparatus provided in any of the foregoing embodiments or an internal storage unit of the above computer device, such as a hard disk or a memory of the computer device. The non-transitory computer-readable storage medium may alternatively be an external storage device of the computer device, such as a plug-in hard disk, a smart media card (SMC), a secure digital (SD) card, a flash card, and the like, configured on the computer device. Further, the non-transitory computer-readable storage medium may alternatively include both an internal storage unit and an external storage device of the computer device. The non-transitory computer-readable storage medium is configured to store the computer-readable instructions and other programs and data needed by the computer device. The non-transitory computer-readable storage medium may also be configured to temporarily store data that has been or will be output.

Furthermore, it is to be pointed that: the embodiments of the disclosure also provide a computer program product. The computer program product includes computer instructions. The computer instructions are stored in a non-transitory computer-readable storage medium. A processor of a computer device reads the computer instructions from a non-transitory computer-readable storage medium, and the processor executes the computer instructions to enable the computer device to perform the method provided by the corresponding embodiment of any of FIG. 3, FIG. 5, and FIG. 6. In addition, the advantageous effects of using the same method are described. For technical details undisclosed in the computer program product involved in the disclosure, reference is made to the descriptions of the method embodiments of the disclosure.

A computer device includes a memory and one or more processors. The memory stores computer-readable instructions. The computer-readable instructions, when executed by the one or more processors, enable the one or more processors to perform steps of the above transaction data processing method.

A computer device includes a memory and one or more processors. The memory stores computer-readable instructions. The computer-readable instructions, when executed by one or more processors, enable the one or more processors to implement steps of the above transaction data processing method.

In some embodiments, a computer program product is further provided, which includes computer-readable instructions. The computer-readable instructions, when executed by a processor, implement steps in various method embodiments described above.

The terms "first", "second", and the like in the description and in the claims and in the drawings of the embodiments of the disclosure are used for distinguishing between different objects and not necessarily for describing a particular sequence. Furthermore, the terms "include" and any variations thereof are intended to cover a non-exclusive inclusion. For example, a process, method, apparatus, product, or apparatus that includes a list of steps or elements is not limited to the listed steps or modules, but may optionally include additional steps or modules not listed or may optionally include additional step elements inherent to such process, method, apparatus, product, or apparatus.

A person of ordinary skill in the art may be aware that, algorithm steps, units, modules, and their equivalents (e.g., submodule, subunit, etc.) of various examples described in the embodiments disclosed herein may be implemented by using electronic hardware, computer software, or a combination thereof. Units and modules implemented by software are stored in memory or non-transitory computer-readable medium. The software units and modules, which include computer instructions or computer code, stored in the memory or medium can run on a processor or circuitry (e.g., ASIC, PLA, DSP, FPGA, or any other integrated circuit) capable of executing computer instructions or computer code. Hardware units and modules can be implemented by processors or circuitry. To clearly describe interchangeability between the hardware and the software, compositions and steps of various examples have been generally described according to functions in the foregoing descriptions. Whether the functions are performed by hardware or software depends on particular applications and design constraints of the technical solutions. A person skilled in the art may realize the described functions for each particular application by different methods, but it is not to be considered that the implementation is beyond the scope of the disclosure.

What is disclosed above is merely exemplary embodiments of the disclosure, and certainly is not intended to limit the scope of the claims of the disclosure. Therefore, equivalent variations made in accordance with the claims of the disclosure shall fall within the scope of the disclosure.

What is claimed is:

1. A method for managing a blockchain, the method being performed by a first consensus node in a blockchain network, and the method comprising:

executing, in response to receiving an initial transaction, the initial transaction to obtain an initial transaction execution record corresponding to the initial transaction;

adding the initial transaction execution record to a first transaction execution data set, the first transaction execution data set being used for recording the initial transaction execution record corresponding to each transaction received by the first consensus node;

adding the initial transaction to a first transaction pool;

acquiring transaction data from the first transaction pool that contains the initial transaction, the transaction data comprising respective initial transaction execution record corresponding to each transaction in a transaction list containing the initial transaction from the first transaction pool, the respective initial transaction corresponding to each transaction in the transaction list being acquired from the first transaction execution data set, wherein the transaction data comprises an initial transaction execution record corresponding to each transaction in the transaction list in the first transaction execution data set, a target transaction execution result corresponding to a verifiable transaction, a target transaction read-write set, and a first block height associated with a first block that is acquired by the first consensus node from the blockchain network in response to executing the verifiable transaction;

generating a proposal block based on the transaction list and the transaction data, the proposal block being subject to block consensus with a second consensus node in the blockchain network; and performing the block consensus on the proposal block to obtain a block consensus result of the proposal block based on conflict detection, wherein the conflict detection comprises:

determining that a transaction in the transaction list is the verifiable transaction and that a local transaction execution record corresponding to the verifiable transaction is local transaction data associated with the verifiable transaction, wherein the local transaction data comprises a local transaction execution result corresponding to the verifiable transaction, a local transaction read-write set, and a second block height associated with a second block that is acquired from the blockchain network by the second consensus node in response to executing the verifiable transaction;

comparing the target transaction execution result with the local transaction execution result to obtain a first comparison result;

based on the first comparison result indicating that the target transaction execution result is same as the local transaction result, comparing the first block height with the second block height to obtain a second comparison result;

obtaining a local verification result corresponding to the proposal block based on the second comparison result; and determining a second consensus result corresponding to the proposal block based on the local verification result.

2. The method according to claim 1, wherein the executing comprises:

acquiring, in response to receiving the initial transaction, an initial service contract for executing the initial transaction;

reading an initial read data set corresponding to the initial transaction from the blockchain network based on the initial service contract;

executing the initial transaction based on the initial read data set to obtain an initial transaction execution result corresponding to the initial transaction;

writing the initial transaction execution result into an initial write data set corresponding to the initial transaction;

generating an initial transaction read-write set corresponding to the initial transaction based on the initial read data set and the initial write data set;

determining a first target block that has an initial maximum generation timestamp in response to executing the initial transaction, wherein a block height of the first target block is an initial block height; and determining the initial transaction execution record based on the initial transaction execution result, the initial transaction read-write set, and the initial block height.

3. The method according to claim 1, wherein generating the proposal block comprises:

obtaining a Merkle tree root corresponding to a verifiable transaction based on a hash operation on the verifiable transaction and the transaction data, wherein a transaction in the transaction list is the verifiable transaction;

acquiring a block having an initial maximum generation timestamp from the blockchain network to obtain a second target block; and generating the proposal block based on the verifiable transaction, the transaction data, the Merkle tree root, and a block hash value of the second target block.

4. The method according to claim 1, wherein performing the block consensus further comprises:

determining the block consensus result of the proposal block based on the second consensus result.

5. The method according to claim 4, further comprising:

based on the block consensus result indicating a successful consensus, determining that a consensus on the proposal block is reached;

responsive to the consensus being reached, writing the proposal block into the blockchain as a third target block; and updating an account state version number corresponding to a transaction object associated with the transaction list.

6. The method according to claim 1, further comprising:

performing validity verification on the initial transaction to obtain a validity verification result;

based on the validity verification result indicates that the initial transaction is valid, determining that the initial transaction passes the validity verification; and broadcasting the initial transaction that passes the validity verification to the second consensus node, so that the second consensus node executes the initial transaction that passes the validity verification.

7. The method according to claim 6, wherein performing the validity verification comprises:

acquiring transaction signature information of the initial transaction and a device public key of a terminal device that transmits the initial transaction, the transaction signature information being obtained after the terminal device signs the initial transaction through a device private key corresponding to the device public key;

obtaining a transaction signature verification result by verifying the transaction signature information based on the device public key;

obtaining a double spending verification result by verifying the initial transaction; and determining the validity verification result based on the transaction signature verification result and the double spending verification result.

8. The method according to claim 7, further comprising:

based on the transaction signature verification result indicating a signature verification success and the double spending verification result indicating no double spending attack, determining that the initial transaction is valid.

9. A method for managing a blockchain, the method performed by a second consensus node in a blockchain network, and the method comprising:

receiving a proposal block broadcast by a first consensus node in the blockchain network, the proposal block being based on a transaction list and transaction data associated with the transaction list, wherein the transaction list is acquired by the first consensus node from a first transaction pool of the first consensus node, and the transaction list contains an initial transaction, and wherein the transaction data comprises an initial transaction execution record corresponding to each transaction in the transaction list in a first transaction execution data set, a target transaction execution result corresponding to a verifiable transaction, a target transaction read-write set, and a first block height associated with a first block that is acquired by the first consensus node from the blockchain network in response to executing the verifiable transaction;

obtaining a second consensus result of the proposal block by performing conflict detection on the proposal block based on a conflict detection policy, wherein the conflict detection comprises:

determining that a transaction in the transaction list is the verifiable transaction and that a local transaction execution record corresponding to the verifiable transaction is local transaction data associated with the verifiable transaction, wherein the local transaction data comprises a local transaction execution result corresponding to the verifiable transaction, a local transaction read-write set, and a second block height associated with a second block that is acquired from the blockchain network by the second consensus node in response to executing the verifiable transaction;

comparing the target transaction execution result with the local transaction execution result to obtain a first comparison result;

based on the first comparison result indicating that the target transaction execution result is same as the local transaction result, comparing the first block height with the second block height to obtain a second comparison result;

obtaining a local verification result corresponding to the proposal block based on the second comparison result; and determining the second consensus result corresponding to the proposal block based on the local verification result; and transmitting the second consensus result of the proposal block to the first consensus node.

10. The method according to claim 9, wherein the local transaction execution record is acquired from a second transaction execution data set, wherein the second transaction execution data set is used for recording a local transaction record corresponding to each transaction received by the second consensus node, and wherein the local transaction execution record corresponding to the verifiable transaction is obtained by the second consensus node by executing the verifiable transaction.

11. The method according to claim 10, the first block height having a first maximum generation timestamp, and wherein the second block having a second maximum generation timestamp.

12. The method according to claim 11, wherein the first maximum generation timestamp is the same as the second maximum generation timestamp; and the determining the local verification result corresponding to the proposal block based on the second comparison result comprises:

based on the second comparison result indicating that the first block height is the same as the second block height, comparing the target transaction read-write set with the local transaction read-write set to obtain a third comparison result; and determining the local verification result corresponding to the proposal block based on the third comparison result.

13. The method according to claim 11, wherein the first maximum generation timestamp is different from the second maximum generation timestamp; wherein the target transaction read-write set comprises a first account state version number, the first account state version number being an account state version number that is associated with the verifiable transaction and that has a first maximum update timestamp, and the first account state version number being acquired by the first consensus node from the blockchain network in response to executing the verifiable transaction; and wherein the local transaction read-write set comprises a second account state version number, the second account state version number being an account state version number that is associated with the verifiable transaction and that has a second maximum update timestamp, and the second account state version number being acquired by the second consensus node from the blockchain network in response to executing the verifiable transaction to be verified; and the determining the local verification result corresponding to the proposal block based on the second comparison result comprises:

based on the second comparison result indicating that the first block height is different from the second block height, comparing the first account state version number with the second account state version number to obtain a fourth comparison result;

based on the fourth comparison result indicating that the first account state version number is different from the second account state version number, acquiring a third account state version number associated with the verifiable transaction and that has a third maximum update timestamp;

comparing the first account state version number with the third account state version number to obtain a fifth comparison result;

based on the fifth comparison result indicating that the third account state version number is lower than the first account state version number, obtaining an updated transaction execution result by re-executing the verifiable transaction;

comparing the target transaction execution result with the updated transaction execution result to obtain a sixth comparison result; and determining the local verification result corresponding to the proposal block based on the sixth comparison result.

14. The method according to claim 9, wherein the conflict detection comprises:

obtaining an association verification result by verifying the transaction list;

acquiring at least two associated transactions having an association relationship from the transaction list based on the association verification result;

acquiring respective transaction read-write sets corresponding to the at least two associated transactions from the transaction data;

obtain a read-write set conflict detection result by performing read-write set conflict detection on the respective transaction read-write sets; and determining the second consensus result corresponding to the proposal block based on the read-write set conflict detection result.

15. A blockchain management system, the blockchain management system comprising a first consensus node in a blockchain network, the first consensus node comprising:

at least one first memory configured to store a first program code; and at least one first processor configured to read the first program code and operate as instructed by the first program code, the first program code comprising:

first executing code configured to cause the at least one first processor to execute, in response to receiving an initial transaction, the initial transaction to obtain an initial transaction execution record corresponding to the initial transaction;

first adding code configured to cause the at least one first processor to add the initial transaction execution record to a first transaction execution data set, the first transaction execution data set being used for recording the initial transaction execution record corresponding to each transaction received by the first consensus node;

second adding code configured to cause the at least one first processor to add the initial transaction to a first transaction pool;

first acquiring code configured to cause the at least one first processor to acquire transaction data from the first transaction pool that contains the initial transaction, the transaction data comprising respective initial transaction execution record corresponding to each transaction in a transaction list containing the initial transaction from the first transaction pool, the respective initial transaction corresponding to each transaction in the transaction list being acquired from the first transaction execution data set, wherein the transaction data comprises an initial transaction execution record corresponding to each transaction in the transaction list in the first transaction execution data set, a target transaction execution result corresponding to a verifiable transaction, a target transaction read-write set, and a first block height associated with a first block that is acquired by the first consensus node from the blockchain network in response to executing the verifiable transaction;

first generating code configured to cause the at least one first processor to generate a proposal block based on the transaction list and the transaction data, the proposal block being subject to block consensus with a second consensus node in the blockchain network; and first performing code configured to cause the at least one first processor to perform the block consensus on the proposal block to obtain a block consensus result of the proposal block based on conflict detection, wherein the first performing code is further configured to cause the at least one first processor to:

determining that a transaction in the transaction list is the verifiable transaction and that a local transaction execution record corresponding to the verifiable transaction is local transaction data associated with the verifiable transaction, wherein the local transaction data comprises a local transaction execution result corresponding to the verifiable transaction, a local transaction read-write set, and a second block height associated with a second block that is acquired from the blockchain network by the second consensus node in response to executing the verifiable transaction;

comparing the target transaction execution result with the local transaction execution result to obtain a first comparison result;

based on the first comparison result indicating that the target transaction execution result is same as the local transaction result, comparing the first block height with the second block height to obtain a second comparison result;

obtaining a local verification result corresponding to the proposal block based on the second comparison result; and determining a second consensus result corresponding to the proposal block based on the local verification result.

16. The blockchain management system according to claim 15, wherein the first executing code further comprises:

second acquiring code configured to cause the at least one first processor to acquire, in response to receiving the initial transaction, an initial service contract for executing the initial transaction;

first reading code configured to cause the at least one first processor to read an initial read data set corresponding to the initial transaction from the blockchain network based on the initial service contract;

second executing code configured to cause the at least one first processor to execute the initial transaction based on the initial read data set to obtain an initial transaction execution result corresponding to the initial transaction;

first writing code configured to cause the at least one first processor to write the initial transaction execution result into an initial write data set corresponding to the initial transaction;

second generating code configured to cause the at least one first processor to generate an initial transaction read-write set corresponding to the initial transaction based on the initial read data set and the initial write data set;

first determining code configured to cause the at least one first processor to determine a first target block that has an initial maximum generation timestamp in response to executing the initial transaction, wherein a block height of the first target block is an initial block height; and second determining code configured to cause the at least one first processor to determine the initial transaction execution record based on the initial transaction execution result, the initial transaction read-write set, and the initial block height.

17. The blockchain management system according to claim 15, wherein the first generating code further comprises:

first obtaining code configured to cause the at least one first processor to obtain a Merkle tree root corresponding to a verifiable transaction based on a hash operation on the verifiable transaction and the transaction data, wherein a transaction in the transaction list is the verifiable transaction;

third acquiring code configured to cause the at least one first processor to acquire a block having an initial maximum generation timestamp from the blockchain network to obtain a second target block; and third generating code configured to cause the at least one first processor to generate the proposal block based on the verifiable transaction, the transaction data, the Merkle tree root, and a block hash value of the second target block.

18. The blockchain management system according to claim 15, wherein the first performing code further comprises:

third determining code configured to cause the at least one first processor to determine the block consensus result of the proposal block based on the second consensus result.

19. The blockchain management system according to claim 15, further comprising:

second performing code configured to cause the at least one first processor to perform validity verification on the initial transaction to obtain a validity verification result;

fourth determining code configured to cause the at least one first processor to determine, based on the validity verification result indicates that the initial transaction is valid, that the initial transaction passes the validity verification; and first broadcasting code configured to cause the at least one first processor to broadcast the initial transaction that passes the validity verification to the second consensus node, so that the second consensus node executes the initial transaction that passes the validity verification.

* * * * *